(12) United States Patent
Hagihara

(10) Patent No.: US 11,543,617 B2
(45) Date of Patent: Jan. 3, 2023

(54) DIFFUSION APPARATUS, OPTICAL APPARATUS, AND PROJECTOR

(71) Applicant: SEIKO EPSON CORPORATION, Tokyo (JP)

(72) Inventor: Takehiko Hagihara, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/199,537

(22) Filed: Mar. 12, 2021

(65) Prior Publication Data

US 2021/0286147 A1 Sep. 16, 2021

(30) Foreign Application Priority Data

Mar. 12, 2020 (JP) .............................. JP2020-042696

(51) Int. Cl.
| | |
|---|---|
| *G03B 21/20* | (2006.01) |
| *G02B 7/02* | (2021.01) |
| *G02B 19/00* | (2006.01) |
| *G02B 5/02* | (2006.01) |

(52) U.S. Cl.
CPC ........... *G02B 7/026* (2013.01); *G02B 5/0278* (2013.01); *G02B 19/0047* (2013.01); *G03B 21/208* (2013.01)

(58) Field of Classification Search
CPC .. G03B 21/204; G03B 21/145; G03B 21/208; G02B 7/026; G02B 27/0927
See application file for complete search history.

(56) References Cited

U.S. PATENT DOCUMENTS

| | | | |
|---|---|---|---|
| 2014/0176915 A1 | 6/2014 | Yamamoto | |
| 2018/0292740 A1 | 10/2018 | Takagi | |
| 2020/0159033 A1* | 5/2020 | Maji | ..................... G02B 27/10 |

FOREIGN PATENT DOCUMENTS

| | | |
|---|---|---|
| JP | 2014-123014 A | 7/2014 |
| JP | 2018-180107 A | 11/2018 |

* cited by examiner

*Primary Examiner* — Ryan D Howard
(74) *Attorney, Agent, or Firm* — Dority & Manning, P.A.

(57) ABSTRACT

A diffusion apparatus includes a diffuser, a substrate to which the diffuser is fixed, and a first lens that has a curved surface and a flat surface located on the side opposite the curved surface and is so fixed to the substrate as to face the diffuser. The substrate includes a first recess having a first bottom surface and a first side surface that rises from the first bottom surface and a second recess having a second bottom surface connected to the first side surface and a second side surface that rises from the second bottom surface. The first lens is so disposed in the second recess that the flat surface is in contact with the second bottom surface. The diffuser is fixed to the first bottom surface.

11 Claims, 11 Drawing Sheets

DIFFUSION APPARATUS, OPTICAL APPARATUS, AND PROJECTOR

The present application is based on, and claims priority from JP Application Serial Number 2020-042696, filed Mar. 12, 2020, the disclosure of which is hereby incorporated by reference herein in its entirety.

BACKGROUND

1. Technical Field

The present disclosure relates to a diffusion apparatus, an optical apparatus, and a projector.

2. Related Art

There has been a known light source apparatus including a light source, a polarization separator, a first light collection system, a fluorescence emitter, a retardation film, a second light collection system, a diffusive reflector, and a main body (see JP-A-2018-180107, for example).

To efficiently collect the light outputted from the light source and cause the collected light to be incident on the phosphor layer, it is required to appropriately set the distance between the first light collection system and a phosphor layer of the fluorescence emitter. In particular, it is required to appropriately set the distance between the lens closest to the phosphor layer out of the lenses that form the first light collection system and the phosphor layer.

In the light source apparatus described in JP-A-2018-180107, however, two pickup lenses that form the first light collection system are fixed to the main body, and the phosphor layer is supported by a substrate fixed to the main body. The distance between the pickup lenses and the phosphor layer can therefore vary in accordance with the dimension errors of the main body and the substrate. When the distance between the pickup lenses and the phosphor layer does not have an appropriate value, the optical performance of the light source apparatus can undesirably decrease.

SUMMARY

A diffusion apparatus according to a first aspect of the present disclosure includes a diffuser that diffuses light, a substrate to which the diffuser is fixed, and a first lens that has a curved surface and a flat surface located on a side opposite the curved surface and is so fixed to the substrate as to face the diffuser. The substrate includes a first recess having a first bottom surface and a first side surface that rises from the first bottom surface and a second recess having a second bottom surface connected to the first side surface and a second side surface that rises from the second bottom surface. The first lens is so disposed in the second recess that the flat surface is in contact with the second bottom surface. The diffuser is fixed to the first bottom surface.

An optical apparatus according to a second aspect of the present disclosure includes the diffusion apparatus described above, an enclosure to which the substrate is fixed, a second lens so provided as to face the first lens, and a second pressing member that presses the second lens against the enclosure. The enclosure includes a lens attachment section to which the second lens is attached. The second pressing member is fixed to the enclosure to press the second lens against the lens attachment section.

A projector according to a third aspect of the present disclosure includes a light source that outputs light, the optical apparatus described above that the light outputted from the light source enters, a light modulator that modulates light outputted from the optical apparatus, and a projection optical apparatus that projects light modulated by the light modulator.

A projector according to a fourth aspect of the present disclosure includes a light source that outputs light, the diffusion apparatus described above that the light outputted from the light source enters, a light modulator that modulates light outputted from the diffusion apparatus, and a projection optical apparatus that projects light modulated by the light modulator.

DESCRIPTION OF EXEMPLARY EMBODIMENTS

An embodiment of the present disclosure will be described with reference to the drawings.

Schematic Configuration of Projector

Figure 1:
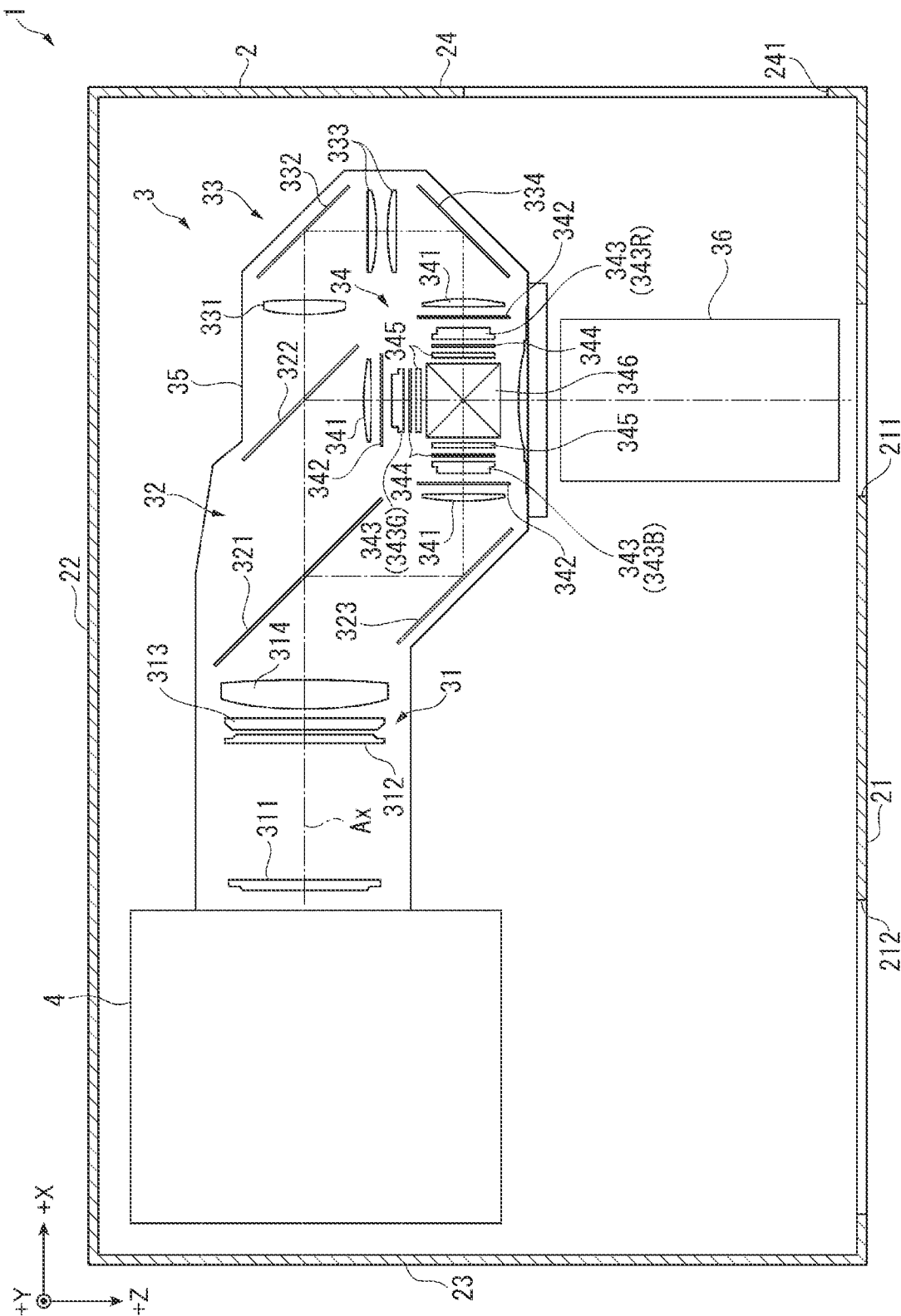
FIG. 1 is a diagrammatic view showing the configuration of a projector according to an embodiment.

FIG. 1 is a diagrammatic view showing a schematic configuration of a projector 1 according to the present embodiment.

The projector 1 according to the present embodiment modulates light outputted from a light source to form an image according to image information and enlarges and projects the formed image on a projection receiving surface, such as a screen. The projector 1 includes an exterior enclosure 2 and an image projection section 3, as shown in FIG. 1. In addition to the components described above, the projector 1 includes, although not shown, a power supply that supplies electronic parts that form the projector 1 with electric power, a controller that controls the action of the projector 1, and a cooler that cools a cooling target that forms the projector 1.

Configuration of Exterior Enclosure

The exterior enclosure 2 forms the exterior of the projector 1 and accommodates the image projection section 3, the power supply, the controller, and the cooler.

The exterior enclosure 2 has a front surface section 21, a rear surface section 22, a left side surface section 23, and a right side surface section 24. Although not shown, the exterior enclosure 2 includes a top surface section that connects one-side ends of the surface sections 21 to 24 to each other and a bottom surface section that connects the-other-side ends of the surface sections 21 to 24 to each other. The exterior enclosure 2 is formed, for example, in a substantially box-like shape.

The right side surface section 24 has an intake port 241. The intake port 241 introduces the air outside the exterior enclosure 2 into the exterior enclosure 2. The intake port 241 may be provided with a filter that traps dust contained in the air passing through the intake port 241.

The front surface section 21 has a passage port 211 located substantially at the center of the front surface section 21. Light projected from a projection optical apparatus 36, which will be described later, passes through the passage port 211.

The front surface section 21 has a discharge port 212 located in the front surface section 21 in a position shifted toward the left side surface section 23. The discharge port 212 discharges air having cooled the cooling target provided in the exterior enclosure 2 out of the exterior enclosure 2.

In the following description, three directions perpendicular to one another are called directions +X, +Y, and +Z. It is assumed in the present embodiment that the direction +X is the direction from the left side surface section 23 toward the right side surface section 24, the direction +Y is the direction from the bottom surface section toward the top surface section, and the direction +Z is the direction from the rear surface section 22 toward the front surface section 21. The direction −z is the direction in which the projection optical apparatus 36, which will be described later, projects light when viewed in the direction +Y.

Although not shown, it is assumed that the direction opposite the direction +X is a direction −X, the direction opposite the direction +Y is a direction −Y, and the direction opposite the direction +Z is a direction −Z.

Configuration of Image Projection Section

The image projection section 3 forms an image according to image information inputted from the controller and projects the formed image. The image projection section 3 includes a light source apparatus 4, a homogenizer 31, a color separator 32, a relay section 33, an image formation section 34, an optical part enclosure 35, and the projection optical apparatus 36.

The configuration of the light source apparatus 4 will be described later in detail.

The homogenizer 31 homogenizes light outputted from the light source apparatus 4. The homogenized light travels via the color separator 32 and the relay section 33 and illuminates a modulation area of each light modulator 343, which will be described later. The homogenizer 31 includes two lens arrays 311 and 312, a polarization converter 313, and a superimposing lens 314.

The color separator 32 separates the light incident from the homogenizer 31 into red light, greenlight, and blue light. The color separator 32 includes two dichroic mirrors 321 and 322 and a reflection mirror 323, which reflects the blue light separated by the dichroic mirror 321.

The relay section 33 is provided in the optical path of the red light, which is longer than the optical paths of the other color light, and suppresses loss of the red light. The relay section 33 includes a light-incident-side lens 331, relay lenses 333, reflection mirrors 332 and 334. In the present embodiment, the relay section 33 is provided in the optical path of the red light, but not necessarily. For example, the blue light may be configured to have an optical path longer than those of the other color light, and the relay section 33 may be provided in the optical path of the blue light.

The image formation section 34 modulates the red light, green light, and blue light incident thereon and combines the modulated red light, green light, and blue light with one another to form an image. The image formation section 34 includes three field lenses 341, three light-incident-side polarizers 342, three light modulators 343, three viewing angle compensators 344, and three light-exiting-side polarizers 345, which are provided in accordance with the incident color light, and one color combiner 346.

The light modulators 343 modulate the light outputted from a light source 411 in accordance with image information. In detail, the light modulators 343 each modulate light outputted from an optical apparatus DV (see FIG. 2), which the light outputted from the light source 411 enters. That is, the light modulators 343 each modulate light outputted from a diffusion apparatus 6 (see FIG. 2), which the light outputted from the light source 411 enters. The light modulators 343 include a light modulator 343R, which modulates the red light, a light modulator 343G, which modulates the green light, and a light modulator 343B, which modulates the blue light. The light modulators 343 are each formed of a transmissive liquid crystal panel, and the light-incident-side polarizers 342, the light modulators 343, and the light-exiting-side polarizers 345 form liquid crystal light valves.

The color combiner 346 combines the color light modulated by the light modulator 343B, the color light modulated by 343G, and the color light modulated by 343R with one another to form an image and outputs the formed image to the projection optical apparatus 36. In the present embodiment, the color combiner 346 is formed of a cross dichroic prism, but not necessarily, and can instead be formed, for example, of a plurality of dichroic mirrors.

The optical part enclosure 35 accommodates the sections 31 to 34 described above. An illumination optical axis Ax, which is the optical axis in the design stage, is set in the image projection section 3, and the optical part enclosure 35 holds the sections 31 to 34 in predetermined positions on the illumination optical axis Ax. The light source apparatus 4 and the projection optical apparatus 36 are disposed in predetermined positions on the illumination optical axis Ax.

The projection optical apparatus 36 is a projection lens that enlarges and projects the image incident from the image formation section 34 on the projection receiving surface. That is, the projection optical apparatus 36 projects the light modulated by the light modulators 343. The projection optical apparatus 36 can, for example, be an assembled lens including a plurality of lenses and a tubular lens barrel that accommodates the plurality of lenses.

Configuration of Light Source Apparatus

Figure 2:
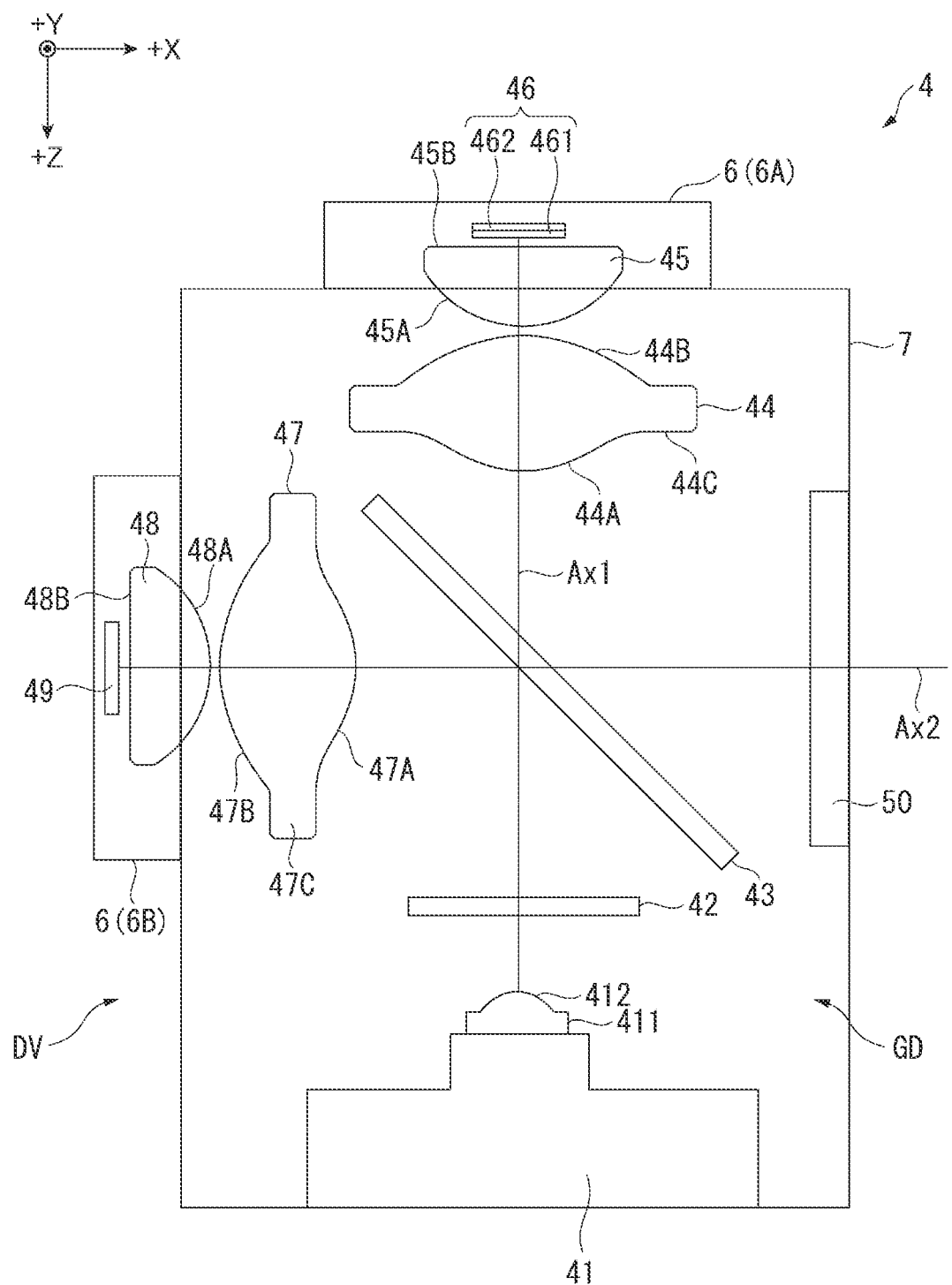
FIG. 2 is a diagrammatic view showing the configuration of a light source apparatus in the embodiment.

FIG. 2 is a diagrammatic view showing the configuration of the light source apparatus 4.

The light source apparatus 4 outputs light with which the light modulators 343 are illuminated to the homogenizer 31. The light source apparatus 4 includes a light source section 41, a diffusive transmitter 42, a light separator 43, a first light collection lens 44, a second light collection lens 45, a wavelength converter 46, a third light collection lens 47, a fourth light collection lens 48, a diffusive reflector 49, a retarder 50, and an enclosure 7, as shown in FIG. 2.

Although will be described later in detail, the second light collection lens 45 and the wavelength converter 46 form a first diffusion apparatus 6A provided in the diffusion apparatus 6, and the fourth light collection lens 48 and the diffusive reflector 49 form a second diffusion apparatus 6B provided in the diffusion apparatus 6. That is, the light source apparatus 4 includes the light source section 41, the diffusive transmitter 42, the light separator 43, the first light collection lens 44, the first diffusion apparatus 6A, the third light collection lens 47, the second diffusion apparatus 6B, the retarder 50, and the enclosure 7.

The configuration of the light source apparatus 4 excluding the light source section 41 forms the optical apparatus DV, which the light outputted from the light source 411 enters. Out of the configuration of the optical apparatus DV, the configuration excluding the first diffusion apparatus 6A and the second diffusion apparatus 6B forms a light guide apparatus GD, which guides the light outputted from the light source section 41 to the first diffusion apparatus 6A and the second diffusion apparatus 6B. That is, the optical apparatus DV includes the first diffusion apparatus 6A, the second diffusion apparatus 6B, and the light guide apparatus GD.

The light source section 41, the diffusive transmitter 42, the light separator 43, the first light collection lens 44, the second light collection lens 45, and the wavelength convener 46 are arranged along an illumination optical axis Ax1 set in the light source apparatus 4.

The light separator 43, the third light collection lens 47, the fourth light collection lens 48, the diffusive reflector 49, and the retarder 50 are arranged along an illumination optical axis Ax2, which is set in the light source apparatus 4 and perpendicular to the illumination optical axis Ax1. That is, the light separator 43 is disposed at the intersection of the illumination optical axis Ax1 and the illumination optical axis Ax2.

The illumination optical axis Ax2 coincides with the illumination optical axis Ax in the position of the lens array 311. In other words, the illumination optical axis Ax2 is set as an extension of the illumination optical axis Ax.

Configuration of Light Source Section

The light source section 41 includes the light source 411, which outputs light, and a collimator lens 412.

Although not shown, the light source 411 is formed of a plurality of semiconductor lasers each outputting blue light.

The collimator lens 412 parallelizes the light outputted from the light source 411.

Configuration of Diffusive Transmitter

The diffusive transmitter 42 diffuses light incident thereon in the process of causing the light to pass therethrough to homogenize the illuminance distribution of the light that exits out thereof. The diffusive transmitter 42 can, for example, have a configuration including a hologram, a configuration in which a plurality of lenslets are arranged in a plane perpendicular to the optical axis, or a configuration in which a surface through which the light passes is a rough surface.

The diffusive transmitter 42 may be replaced with a homogenizer optical element including a pair of multi-lens arrays. On the other hand, when the diffusive transmitter 42 is employed, the distance from the light source section 41 to the light separator 43 can be reduced as compared with the case where the homogenizer optical element is employed.

Configuration of Light Separator

The light having exited out of the diffusive transmitter 42 enters the light separator 43.

The light separator 43 has the function of a half-silvered mirror that transmits part of light incident thereon from the light source section 41 via the diffusive transmitter 42 and reflects the remaining light. The light separator 43 further has the function of a dichroic mirror that transmits blue light incident from the diffusive reflector 49 and reflects light Incident from the wavelength converter 46 and having wavelengths longer than the wavelength of the blue light.

In detail, the light separator 43 transmits first partial light that is part of the blue light incident from the diffusive transmitter 42 to cause the transmitted light to enter the first light collection lens 44 and reflects second partial light that is the remaining blue light to cause the reflected light to enter the third light collection lens 47.

In the present embodiment, the light separator 43 is so configured that the amount of first partial light is greater than the amount of second partial light in consideration of light absorbed by the wavelength converter 46, but not necessarily. The amount of first partial light may be equal to or smaller than the amount of second partial light.

Configurations of First and Second Light Collection Lenses

The first light collection lens 44 and the second light collection lens 45 collect the first partial light having passed through the light separator 43 and causes the collected light to be incident on the wavelength converter 46. Further, the first light collection lens 44 and the second light collection lens 45 parallelize fluorescence incident from the wavelength converter 46.

Out of the first light collection lens 44 and the second light collection lens 45, the second light collection lens 45, which is closer to the wavelength converter 46, corresponds to the first lens in the present disclosure and forms the first diffusion apparatus 6A, which will be described later. Out of the first light collection lens 44 and the second light collection lens 45, the first light collection lens 44, which is farther from the wavelength converter 46, corresponds to the second lens for a first diffusion apparatus in the present disclosure and is attached to a lens attachment section 82 of the enclosure 7.

In the present embodiment, the first light collection lens 44 has a curved surface 44A, which faces the positive side of the direction Z, a curved surface 44B, which faces the negative side of the direction Z, and a flange 44C, which protrudes outward in the radial direction around the optical axis of the first light collection lens 44. In the present embodiment, the curved surface 44A is a convex curved surface protruding in the direction +Z.

Configuration of Wavelength Converter

The wavelength converter 46 forms a diffuser 65, which will be described later, in the first diffusion apparatus 6A. The wavelength converter 46 converts the wavelength of the light incident thereon, diffuses the converted light in the direction opposite the direction in which the incident light travels, and outputs the diffused light. In detail, the wavelength converter 46 is excited with the blue light incident thereon, diffuses the resultant fluorescence having wavelengths longer than the wavelength of the incident blue light, and outputs the diffused fluorescence toward the second light collection lens 45. In other words, the wavelength converter 46 converts the wavelength of the light incident thereon, diffuses the converted light, and outputs the diffused light. The light outputted from the wavelength converter 46 is, for example, fluorescence having a peak wavelength ranging from 500 to 700 nm.

The wavelength converter 46 includes a wavelength conversion layer 461 and a reflection layer 462. The wavelength conversion layer 461 contains a phosphor that converts the wavelength of the incident blue light into the fluorescence, which is non-polarized light, diffuses the fluorescence, and outputs the diffused fluorescence. The reflection layer 462 is located on a side of the wavelength conversion layer 461 that is the side opposite the blue light incident side and reflects the fluorescence incident from the wavelength conversion layer 461 toward the wavelength conversion layer 461.

The fluorescence outputted from the wavelength converter 46 passes through the second light collection lens 45 and the first light collection lens 44 along the illumination optical axis Ax1 and is incident on the light separator 43. The fluorescence incident on the light separator 43 is reflected off the light separator 43 in the direction along the illumination optical axis Ax2 and enters the retarder 50.

Configurations of Third and Fourth Light Collection Lenses

The third light collection lens 47 and the fourth light collection lens 48 collect the second partial light having been reflected off the light separator 43 and having entered the two light collection lenses and causes the collected light to be incident on the diffusive reflector 49. Further, the third light collection lens 47 and the fourth light collection lens 48 parallelize the blue light incident from the diffusive reflector 49.

Out of the third light collection lens 47 and the fourth light collection lens 48, the fourth light collection lens 48, which is closer to the diffusive reflector 49, corresponds to the first lens in the present disclosure and forms the second diffusion apparatus 6B, which will be described later. Out of the third light collection lens 47 and the fourth light collection lens 48, the third light collection lens 47, which is farther from the diffusive reflector 49, corresponds to the second lens for a second diffusion apparatus in the present disclosure and is attached to a lens attachment section 83 of the enclosure 7.

In the present embodiment, the third light collection lens 47 has a curved surface 47A, which faces the positive side of the direction X, a curved surface 47B, which faces the negative side of the direction X, and a flange 47C, which protrudes outward in the radial direction around the optical axis oi the third light collection lens 47. In the present embodiment, the curved surface 47A is a convex curved surface protruding in the direction +X.

Configuration of Diffusive Reflector

The diffusive reflector 49 forms the diffuser 65, which will be described later, in the second diffusion apparatus 6B. The diffusive reflector 49 diffusively reflects the blue light incident thereon in such a way that the incident blue light is diffused at an angle of diffusion equal to that of the fluorescence outputted from the wavelength converter 46. That is, the diffusive reflector 49 does not convert the wavelength of the incident light but diffusively reflects the incident light.

The blue light reflected off the diffusive reflector 49 passes through the fourth light collection lens 48 and the third light collection lens 47, passes through the light separator 43, and enters the retarder 50. That is, the light that exits out of the light separator 43 and enters the retarder 50 is white light that is the mixture of the blue light and the fluorescence.

Configuration of Retarder

The retarder 50 converts the white light incident from the light separator 43 into light that is the mixture of s-polarized light and p-polarized light. The thus converted white illumination light enters the homogenizer 31 described above.

Configuration of Diffusion Apparatus

Figure 3:
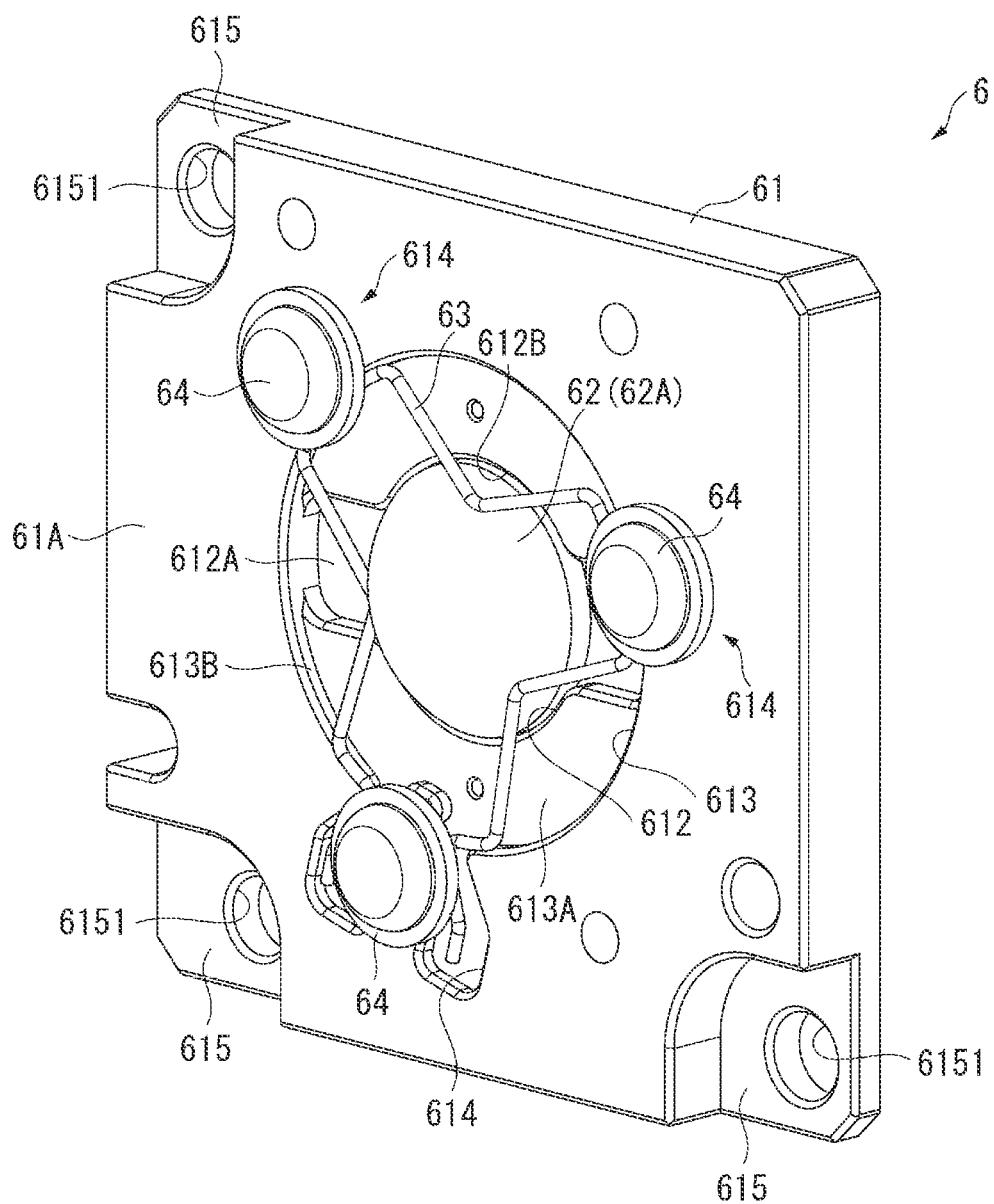
FIG. 3 is a perspective view showing a diffusion apparatus in the embodiment.
Figure 4:
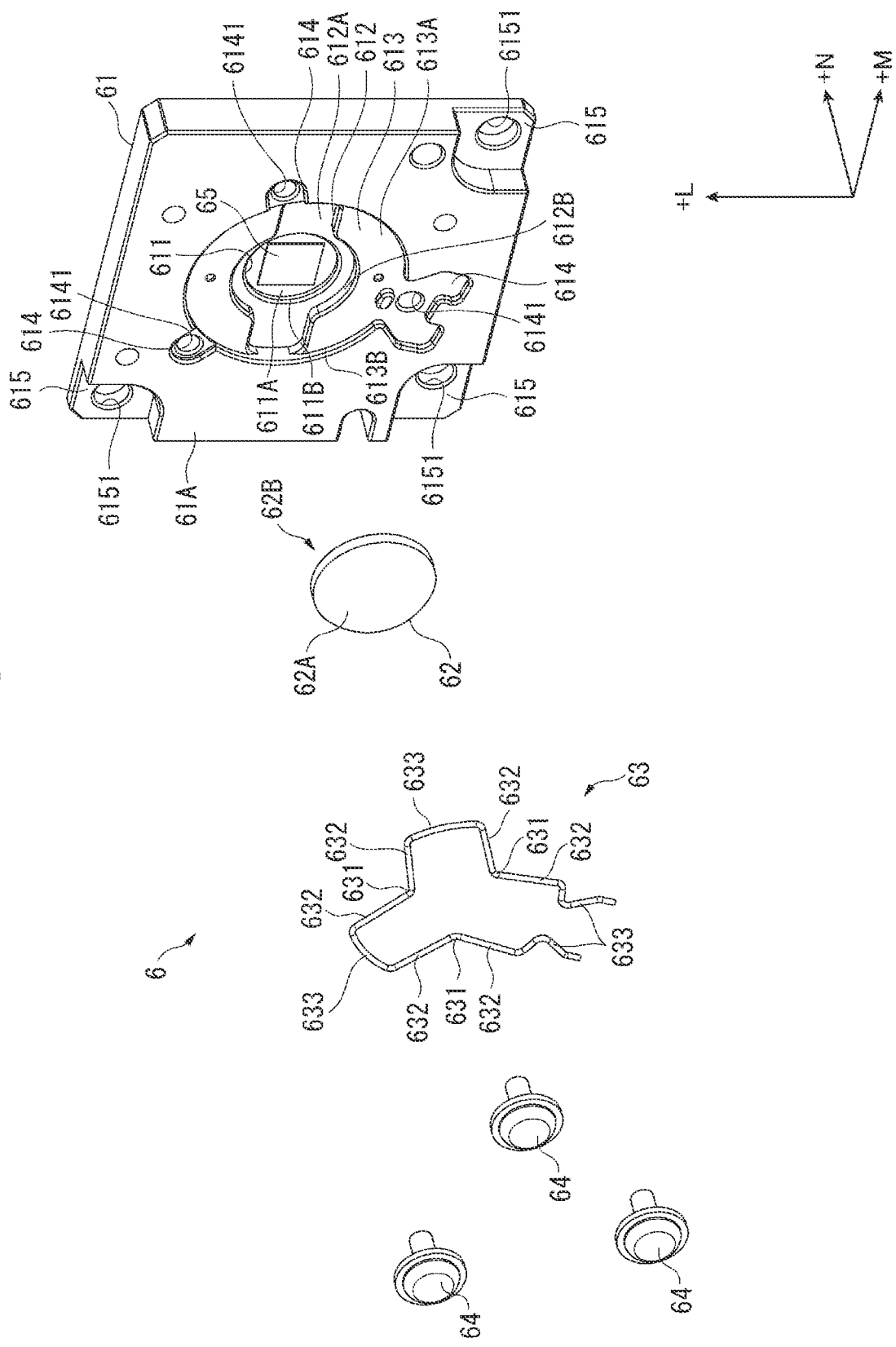
FIG. 4 is an exploded perspective view showing the diffusion apparatus in the embodiment.

FIG. 3 is a perspective view showing the diffusion apparatus 6 viewed from the external light incident side, and FIG. 4 is an exploded perspective view showing the diffusion apparatus 6.

The configuration of the diffusion apparatus 6 will be described below in detail.

The diffusion apparatus 6 has the basic configuration of the first diffusion apparatus 6A and the second diffusion apparatus 6B employed in the light source apparatus 4 and diffuses light incident thereon.

The diffusion apparatus 6 includes a substrate 61, a lens 62, a pressing member 63, and fixing members 64, as shown in FIGS. 3 and 4, and further includes the diffuser 65, as shown in FIG. 4.

In the diffusion apparatus 6, three directions perpendicular to one another are called directions +L, +M, and +N. Out of the three directions, it is assumed that the direction +N is the direction in which the light that enters the diffusion apparatus 6 travels. It is further assumed that the direction opposite the direction +L is a direction −L, the direction opposite the direction +M is a direction −M, and the direction opposite the direction +N is a direction −N.

Configuration of Substrate

The substrate 61 is, for example, made of metal having thermal conductivity and formed in a plate-like shape, supports the lens 62, the pressing member 63, the fixing members 64, and the diffuser 65, and dissipates heat transferred from the diffuser 65 to an outside environment.

The substrate 61 includes a first recess 611, a second recess 612, a third recess 613, a plurality of fixing sections 614, and a plurality of attachment sections 615, as shown in FIG. 4.

The first recess 611, the second recess 612, and the third recess 613 are provided in a surface 61A of the substrate 61, which is the surface facing the negative side of the direction N, which is the light incident side.

The first recess 611 is located substantially at the center of the surface 61A. The first recess 611 is formed substantially in a circular shape when viewed in the direction −N. The first recess 611 has a first bottom surface 611A, which is perpendicular to the direction +N, and a first side surface 611B, which rises in the direction −N from the circumferential edge of the first bottom surface 611A.

The diffuser 65 is disposed on the first bottom surface 611A.

The second recess 612 surrounds the first recess 611 when viewed in the direction −N. The second recess 612 is formed in a shape that is the combination of a circle and a rectangle when viewed in the direction −N. The circular portion of the second recess 612 is so formed as to be substantially concentric with the first recess 611 when viewed in the direction −N.

The second recess 612 has a second bottom surface 612A, which is perpendicular to the direction +N, and a second side surface 612B, which rises in the direction −N from the circumferential edge of the second bottom surface 612A.

The second bottom surface 612A is connected to an end of the first side surface 611B that is the end facing the negative side of the direction N. The second bottom surface 612A is a flat surface on which the lens 62 is disposed.

The second side surface 612B has portions recessed in the directions +L and −L. The portions described above may be omitted, and the second recess 612 may be formed in a substantially circular shape when viewed in the direction −N.

The third recess 613 surrounds the second recess 612 when viewed in the direction −N. The third recess 613 is formed substantially in a circular shape when viewed in the direction −N. Specifically, the third recess 613 is so formed as to be substantially concentric with the first recess 611 and the second recess 612 when viewed in the direction −N.

The third recess 613 has a third bottom surface 613A, which is perpendicular to the direction +N, and a third side surface 613B, which rises in the direction −N from the circumferential edge of the third bottom surface 613A.

The third bottom surface 613A is connected to an end of the second side surface 612B that is the end facing the negative side of the direction N. The pressing member 63 is disposed on the third bottom surface 613A, as shown in FIG. 3.

The second recess 612 is provided in the third bottom surface 613A of the third recess 613, and the first recess 611 is provided in the second bottom surface 612A of the second recess 612, as shown in FIG. 4.

The plurality of fixing sections 614 are provided at the outer edge of the third recess 613. In the present embodiment, the fixing sections 614 are formed of three fixing sections 614, which is each provided at the bottom of a recess that is part of the third recess 613 and protrudes outward in the radial direction. In other words, the plurality of fixing sections 614 are provided at the third bottom surface 613A.

The fixing sections 614 each has a screw hole 6141, and the fixing members 64, which fix the pressing member 63 to the substrate 61, are fixed into the screw holes 6141.

The plurality of attachment sections 615 are portions that attach the substrate 61 to the enclosure 7 and are provided at corners of the substrate 61. In detail, the plurality of attachment sections 615 are provided at three of the four corners of the substrate 61, which has a substantially rectangular shape when viewed in the direction −N.

The attachment sections 615 each have a hole 6151, and fixtures FM, which fix the diffusion apparatus 6 to the enclosure 7, are inserted through the holes 6151.

Configuration of Lens

The lens 62 collects the light that enters the diffusion apparatus 6 and causes the collected light to be incident on the diffuser 65, which is disposed on the first bottom surface 611A. Further, the lens 62 parallelizes the light that exits out of the diffuser 65 in the direction −N in the process of causing the light to pass through the lens 62 in the direction −N.

The lens 62 has a curved surface 62A and a flat surface 62B, which is located on the side opposite the curved surface 62A. The lens 62 is so disposed in the second recess 612 that the curved surface 62A faces the negative side of the direction N and the flat surface 62B is in contact with the second bottom surface 612A. As described above, when the lens 62 is so disposed on the substrate 61 that the flat surface 62B is in contact with the second bottom surface 612A, the space in the first recess 611 is closed and sealed by the lens 62.

In the present embodiment, the curved surface 62A of the lens 62 is a convex curved surface protruding in the direction −N, but not necessarily. A surface of the lens 62 that is the surface facing the negative side of the direction N may instead be a concave curved surface or a flat surface.

The thus configured lens 62 is fixed to the substrate 61 by the pressing member 63. That is, the lens 62 is fixed to the substrate 61 by the pressing member 63 without use of any adhesive.

Configurations of Pressing Member and Fixing Members

The pressing member 63 is a spring formed of a bent wire and is a frame-shaped member that presses the lens 62 against the second bottom surface 612A and fixes the lens 62 thereto. The pressing member 63 includes three contact sections 631, which are arranged in the circumferential direction at equal angular intervals of 120° around the center of the pressing member 63, six extending sections 632, which extend outward from the three contact sections 631, and three fixation receiving sections 633, which each form extending-direction tip portions of two extending sections 632 extending in the same direction out of the six extending sections 632.

Each of the three contact sections 631 is in contact with the curved surface 62A of the lens 62 to press the lens 62 against the second bottom surface 612A. That is, the pressing member 63 is in contact with the curved surface 62A at a plurality of locations to press the lens 62 against the second bottom surface 612A and fix the lens 62 thereto.

The three fixation receiving sections 633 are fixed to the fixing sections 614 by the fixing members 64. That is, the pressing member 63 is fixed to the third bottom surface 613A.

In the present embodiment, the fixing members 64 are each a screw fixed to the corresponding screw hole 6141. The fixing members 64 may, however, each be a fixture different from a screw.

Configuration of Diffuser

The diffuser 65 is disposed on the first bottom surface 611A of the first recess 611, which is sealed by the lens 62. The diffuser 65 diffuses light. In the present embodiment, the diffuser 65 diffuses light in the direction opposite the direction in which the light is incident on the diffuser 65.

The diffuser 65 can, for example, be the wavelength converter 46 and the diffusive reflector 49 described above.

Type of Diffusion Apparatus

Figure 5:
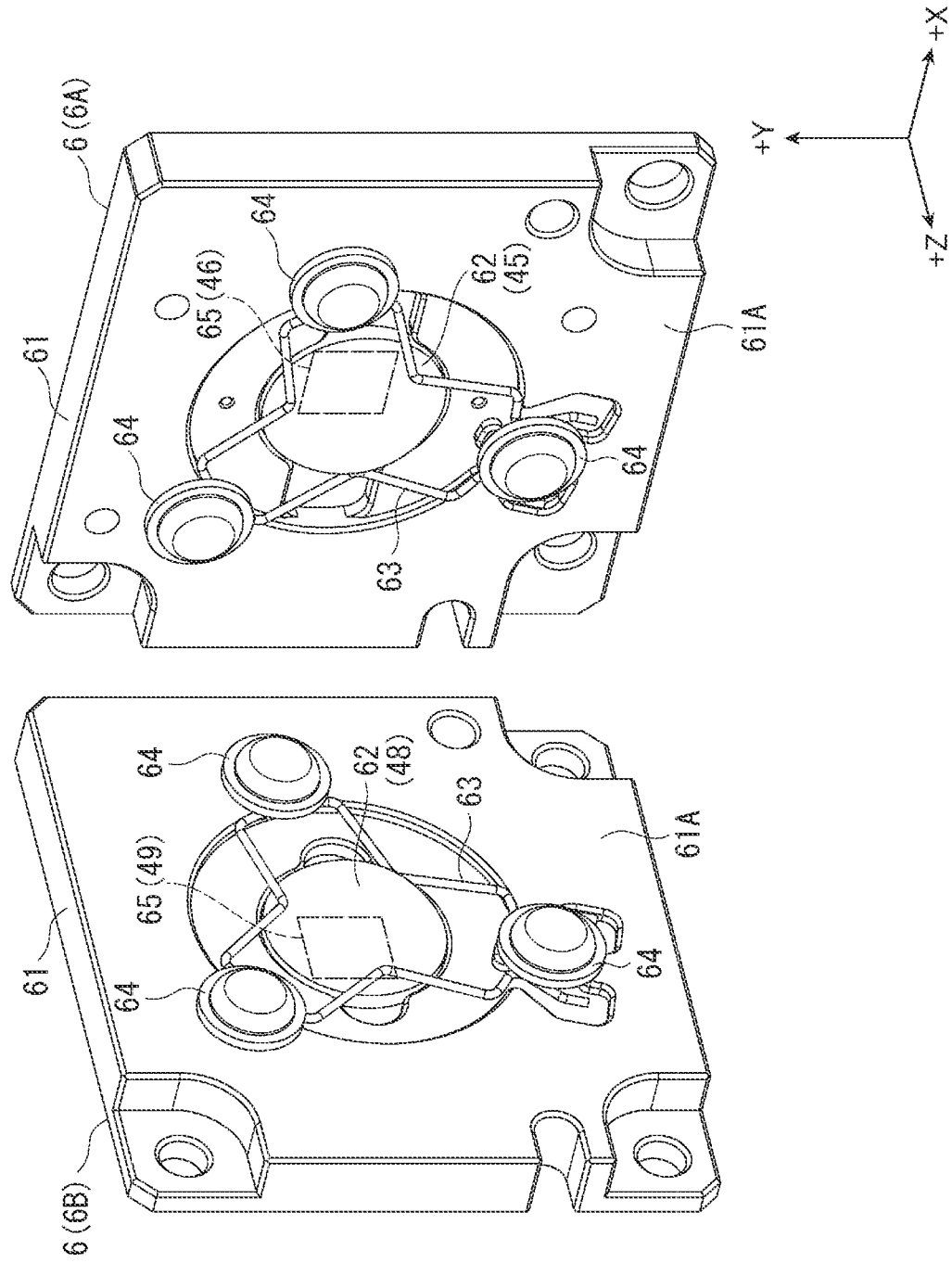
FIG. 5 is a perspective view showing a first diffusion apparatus and a second diffusion apparatus in the embodiment.

FIG. 5 is a perspective view showing the first diffusion apparatus 6A and the second diffusion apparatus 6B.

The diffusion apparatus 6 includes the first diffusion apparatus 6A and the second diffusion apparatus 6B. The first diffusion apparatus 6A and the second diffusion apparatus 6B have the same configuration except that the configurations of the lens 62 and the diffuser 65 differ between the two diffusion apparatuses, as shown in FIG. 5.

That is, the first diffusion apparatus 6A includes the second light collection lens 45 as the lens 62 and the wavelength converter 46 as the diffuser 65 in addition to the substrate 61, the pressing member 63, and the plurality of fixing members 64. The second diffusion apparatus 6B includes the fourth light collection lens 48 as the lens 62 and the diffusive reflector 49 as the diffuser 65 in addition to the substrate 61, the pressing member 63, and the plurality of fixing members 64. The diffusive reflector 49 may be formed of a diffusive reflection layer provided on the first bottom surface 611A or minute irregularities formed on the first bottom surface 611A.

The pressing member 63 and the fixing members 64 provided in the first diffusion apparatus 6A correspond to a first pressing member and first fixing members, and the pressing member 63 and the fixing members 64 provided in the second diffusion apparatus 6B correspond to a second pressing member and second fixing members.

The light source apparatus 4 includes the first diffusion apparatus 6A and the second diffusion apparatus 6B, as shown in FIG. 2.

Configuration of Enclosure

Figure 6:
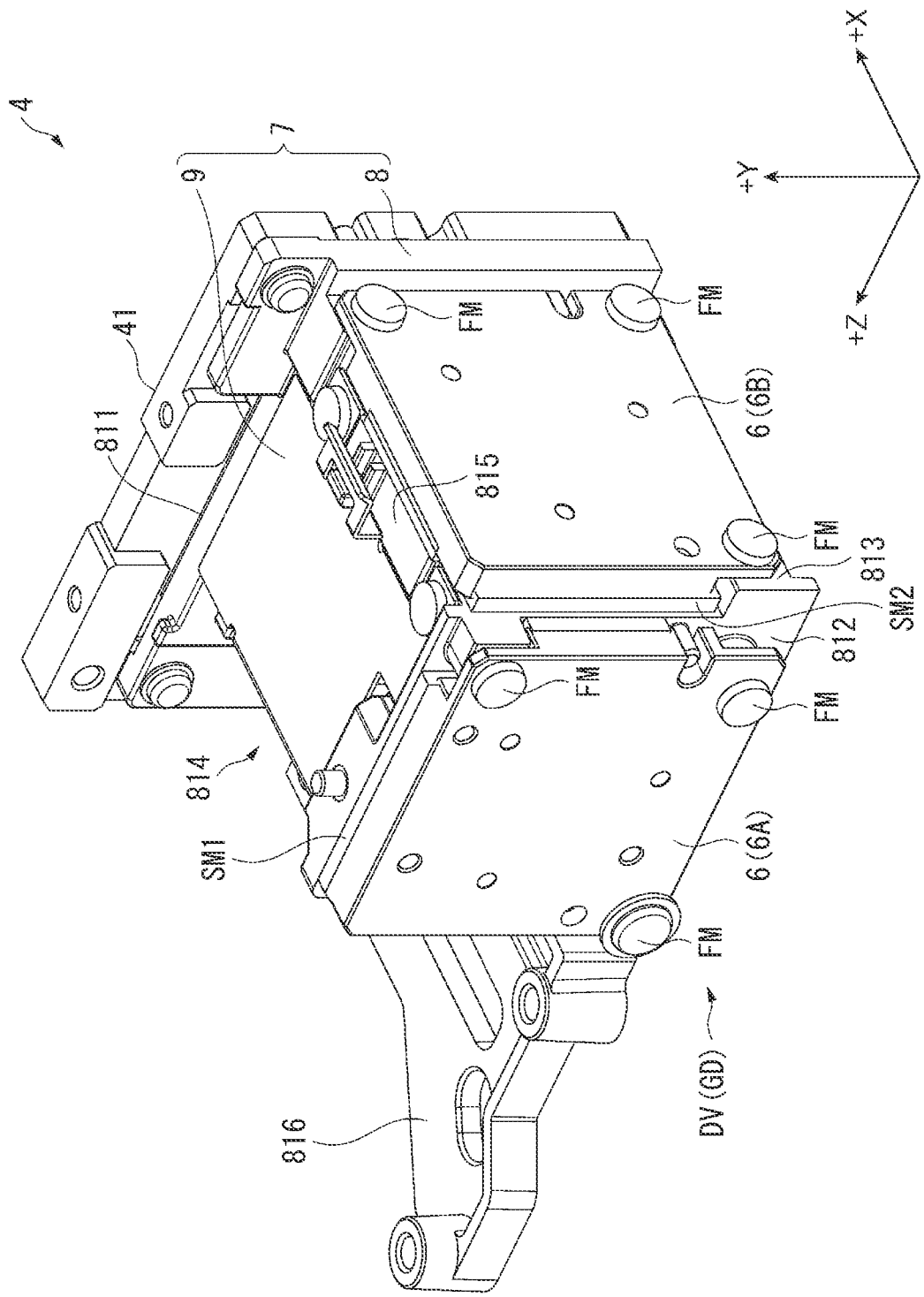
FIG. 6 is a perspective view showing the light source apparatus in the embodiment.
Figure 7:
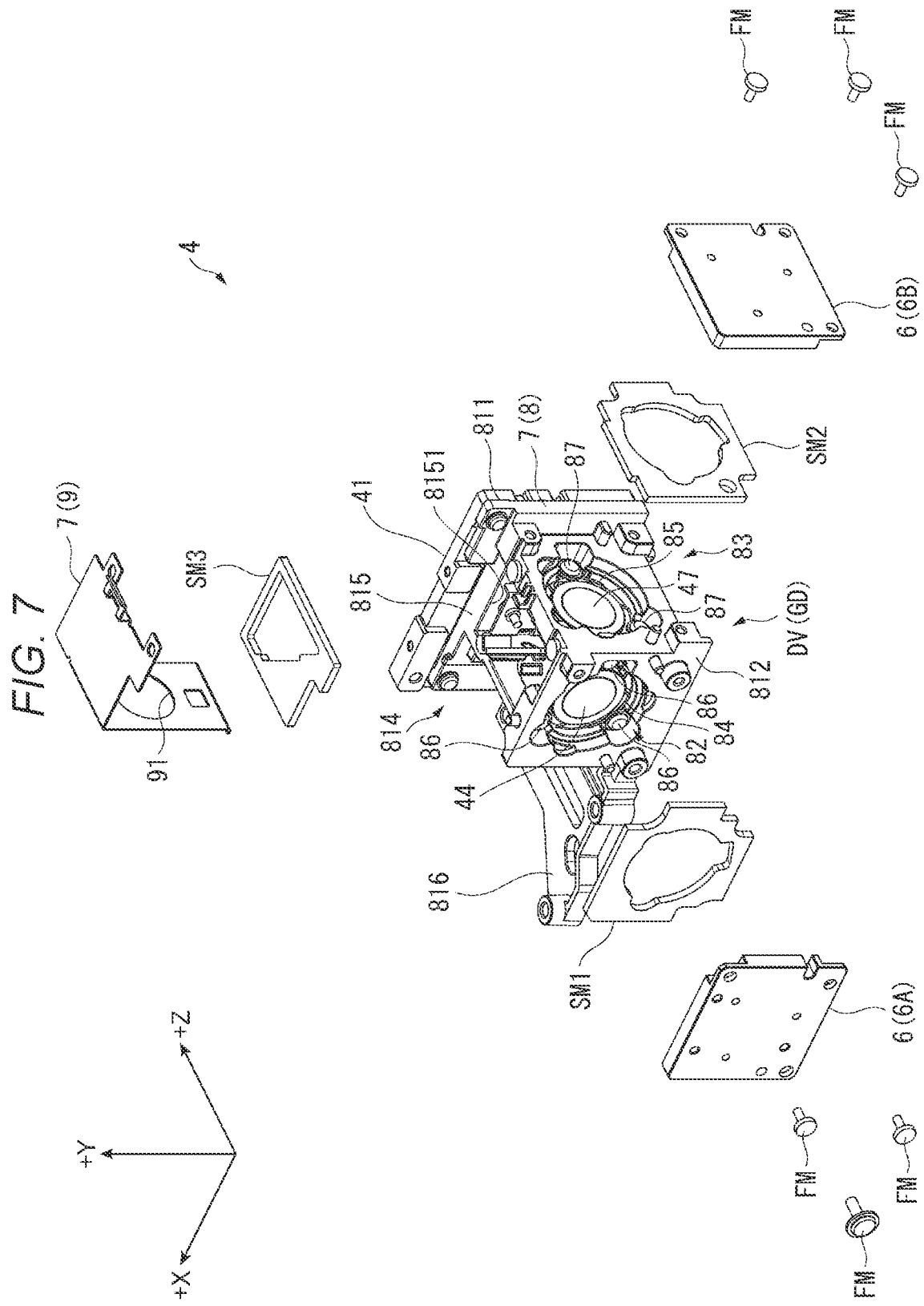
FIG. 7 is an exploded perspective view showing the light source apparatus in the embodiment.

FIG. 6 is a perspective view showing the enclosure 7 of the light source apparatus 4. FIG. 7 is an exploded perspective view showing the enclosure 7.

The enclosure 7 is a substantially cubic light source enclosure which holds the light source section 41, the diffusive transmitter 42, the light separator 43, the first light collection lens 44, the third light collection lens 47, and the retarder 50, which form the light source apparatus 4, and to which the first diffusion apparatus 6A and the second diffusion apparatus 6B are attached.

The enclosure 7 includes an enclosure main body 8 and a cover member 9, as shown in FIGS. 6 and 7.

Configuration of Cover Member

The cover member 9 is so attached to the enclosure main body 8 as to cover a fourth side surface section 814 and a fifth side surface section 815, which will be described later, of the enclosure main body 8. The cover member 9 is provided with an opening 91, which is so located as to cover the fourth side surface section 814 and through which the light having exited out of the retarder 50 passes, as shown in FIG. 7. The opening 91 is closed by a light transmissive member that is not shown.

Configuration of Enclosure Main Body

The enclosure main body 8 includes a first side surface section 811, a second side surface section 812, a third side surface section 813, the fourth side surface section 814, the fifth side surface section 815, and a base section 816, as shown in FIGS. 6 and 7, and further includes the lens attachment sections 82 and 83, pressing members 84 and 85, and a plurality of fixing members 86 and 87, which will be described later, as shown in FIG. 7. In addition to the above, the enclosure main body 8 includes, although not shown, fixing sections to which the diffusive transmitter 42, the light separator 43, and the retarder 50 are fixed.

The first side surface section 811 is a side surface section of the enclosure main body 8 that is the side surface section facing the positive side of the direction Z. The light source section 41 is attached to the first side surface section 811.

The second side surface section 812 is a side surface section of the enclosure main body 3 that is the side surface section facing the negative side of the direction Z. The first diffusion apparatus 6A is attached to the second side surface section 812 by using the fixtures FM, which are inserted through the attachment sections 615, in such a way that the surface 61A of the substrate 61 faces the second side surface section 812. In this process, the first diffusion apparatus 6A is so fixed to the second side surface section 812 that the direction +N coincides with the direction −Z and the direction +L coincides with the direction +Y.

A sealing member SM1, which is made, for example, of resin foam, is interposed between the substrate 61 of the first diffusion apparatus 6A and the second side surface section 812.

The third side surface section 813 is a side surface section of the enclosure main body 8 that is the side surface section facing the negative side of the direction X. The second diffusion apparatus 6B is attached to the third side surface section 813 by using the fixtures FM, which are inserted into the attachment sections 615. In this process, the second diffusion apparatus 6B is so fixed to the third side surface section 813 that the direction +N coincides with the direction −X and the direction +L coincides with the direction +Y.

A sealing member SM2, which is similar to the sealing member SM1, is interposed between the substrate 61 of the second diffusion apparatus 6B and the third side surface section 813.

The fourth side surface section 814 is a side surface section of the enclosure main body 8 that is the side surface section facing the positive side of the direction X. The fourth side surface section 814 is covered with the cover member 9.

The fifth side surface section 815 is a side surface section of the enclosure main body 8 that is the side surface section facing the positive side of the direction Y. The fifth side surface section 815 has an opening 8151 for accommodating the diffusion transmitter 42 and the light separator 43 in the enclosure main body 8, as shown in FIG. 7.

A sealing member SM3, which is similar to the sealing members SM1 and SM2, is attached to a portion of the fifth side surface section 815 that is a portion around the opening 8151. The cover member 9 is so attached to the fifth side surface section 815 as to cover the sealing member SM3.

The base section 816 is a portion of the enclosure main body 8 that is a portion located in a position shifted in the direction −Y and fixed to the inner surface of the exterior enclosure 2, as shown in FIGS. 6 and 7. The enclosure 7 and in turn the light source apparatus 4 are thus fixed to the inner surface of the exterior enclosure 2.

Configuration of Lens Attachment Sections

Figure 8:
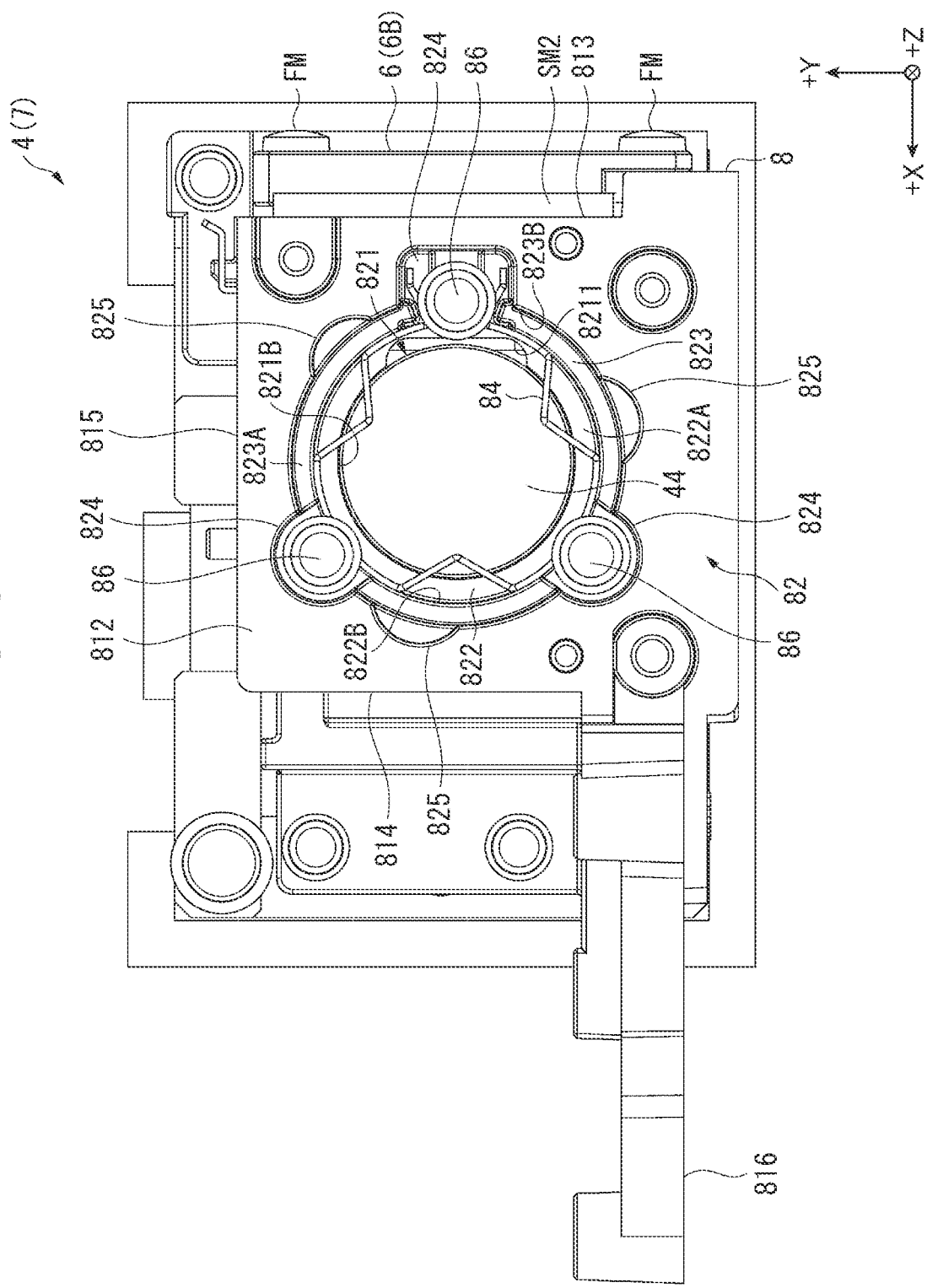
FIG. 8 shows a lens attachment section and a first light collection lens in the embodiment.
Figure 9:
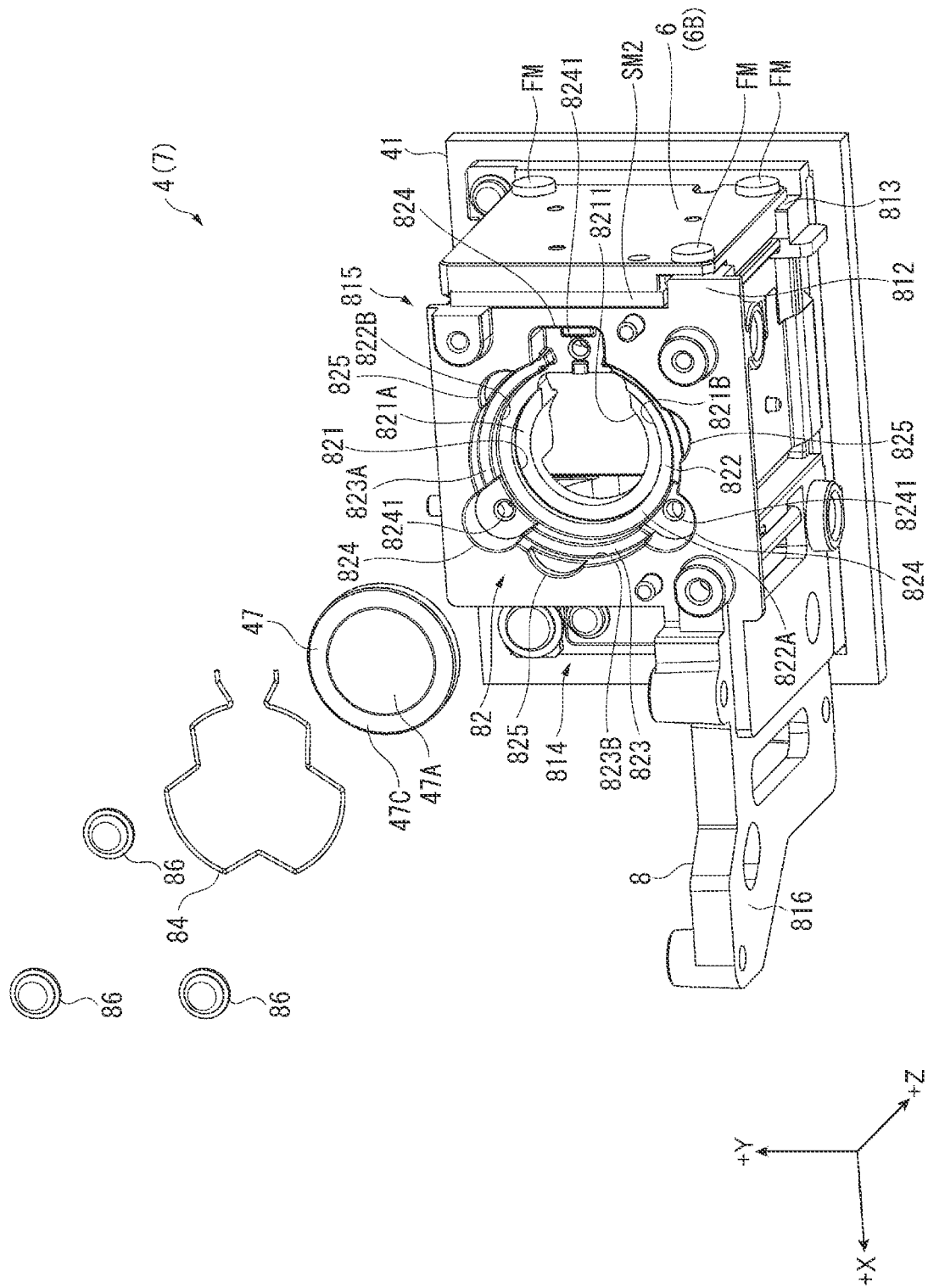
FIG. 9 is an exploded perspective view showing an enclosure main body, the first light collection lens, a pressing member, and fixing members in the embodiment.

FIG. 8 shows the lens attachment section 82 viewed in the direction −Z. FIG. 9 is an exploded perspective view showing the enclosure main body 8, the first light collection lens 44, the pressing member 84, and the fixing members 86.

The lens attachment section 82 is a portion which is in the enclosure main body 8 in a position inside the second side surface section 812 and to which the first light collection lens 44 is attached. The lens attachment section 82 includes a first recess 821, a second recess 822, a third recess 823, a plurality of fixing sections 824, and a plurality of stepped sections 825, as shown in FIGS. 8 and 9.

The first recess 821 is a portion located substantially at the center of the lens attachment section 82 and recessed in the direction +Z, which is the direction toward the light separator 43. The first recess 821 is formed substantially in a circular shape when viewed in the direction −Z. The first recess 821 has a first bottom surface 621A, which is perpendicular to the direction +Z, and a first side surface 821B, which rises in the direction −Z from the circumferential edge of the first bottom surface 321A.

A surface of the flange 44C of the first light collection lens 44 that is the surface facing the positive side of the direction 2 is in contact with the first bottom surface 821A. An opening 8211, where part of the curved surface 44A of the first light collection lens 44 is disposed, is formed substantially at the center of the first bottom surface 821A.

The second recess 822 surrounds the first recess 821 when viewed in the direction −Z, as shown in FIGS. 8 and 9. That is, the second recess 322 is located outside the first recess 821. The second recess 822 is formed substantially in a circular shape when viewed in the direction −Z. That is, the second recess 322 is so formed as to be substantially concentric with the first recess 821 when viewed in the direction −Z.

The second recess 822 has a second bottom surface 822A, which is perpendicular to the direction +Z, and a second side surface 822B, which rises in the direction −Z from the circumferential edge of the second bottom surface 822A. The second bottom surface 822A is connected to an end of the first side surface 821B that is the end facing the negative side of the direction Z.

The pressing member 84 is disposed in the second recess 822.

The third recess 823 surrounds the second recess 822 when viewed in the direction −Z. The third recess 823 is formed substantially in a circular shape when viewed in the direction −Z. Specifically, the third recess 823 is so formed as to be substantially concentric with the first recess 821 and the second recess 822 when viewed in the direction −Z.

The third recess 823 has a third bottom surface 823A, which is perpendicular to the direction +Z, and a third side surface 823B, which rises in the direction −Z from the circumferential edge of the third bottom surface 823A.

As described above, the second recess 822 is provided in the third bottom surface 323A of the third recess 823, and the first recess 821 is provided in the second bottom surface 822A of the second recess 822.

The plurality of fixing sections 824 are provided at the outer edge of the second recess 822. In the present embodiment, the fixing sections 824 are formed of three fixing sections 824, and the three fixing sections 824 each protrude outward in the radial direction of the second recess 822 from the outer edge of the second recess 822 and further protrude outward in the radial direction of the third recess 823 from the outer edge of the third recess 823.

The fixing sections 824 each have a screw hole 8241, to which the corresponding one of the fixing members 86, which fix the pressing member 84 to the lens attachment section 82, is fixed, as shown in FIG. 9.

The pressing member 84 is a spring formed of a bent wire, as the pressing member 63 is. The pressing member 84 has the same shape as that of the pressing member 63.

The plurality of fixing members 86 are each a fixture that fixes the pressing member 84 to the lens attachment section 82 and are each formed of a screw in the present embodiment.

The pressing member 84 is fixed to the lens attachment section 82 when the plurality of fixing members 86 are each fixed to the corresponding screw hole 8241 with the pressing member 84 being in contact with the curved surface 44B of the first light collection lens 44, which is the surface facing the negative side of the direction Z. The first light collection lens 44 is thus pressed by the pressing member 84 against the first bottom surface 821A and fixed thereto, as shown in FIG. 8.

The plurality of stepped sections 825 are each a recess that protrudes outward in the radial direction of the third recess 823 and is recessed in the direction +Z, as shown in FIGS. 8 and 9. The bottom of each of the stepped sections 825 is shifted from the third bottom surface 823 in the direction −Z. The stepped sections 825 are each a recess that prevents interference with the fixing members 64 when the first diffusion apparatus 6A is attached to the second side surface section 812.

Figure 10:
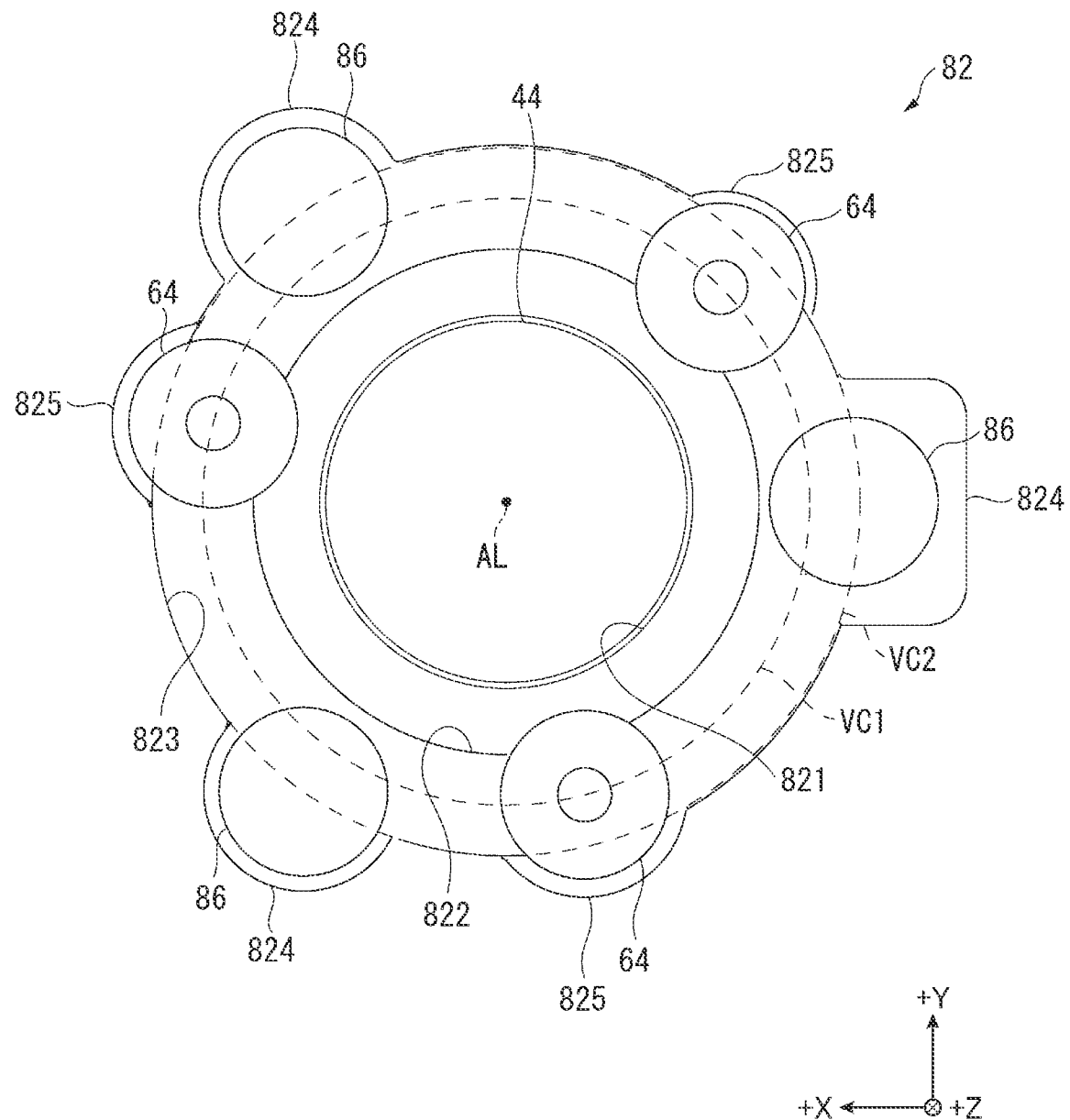
FIG. 10 shows the positional relationship between the fixing members in the embodiment.

FIG. 10 shows the positional relationship between the fixing members 64 and 86. In FIG. 10, the lens attachment section 82 is simplified in consideration of clarification of the illustration.

When the first diffusion apparatus 6A is attached to the second side surface section 812, the plurality of fixing members 64 are each disposed at the corresponding stepped section 825 of the plurality of stepped sections 825 when viewed in the direction −Z, as shown in FIG. 10.

At this point, the center of each of the plurality of fixing members 64 is located on a first virtual circle VC1 around an optical axis AL of the first light collection lens 44 when viewed in the direction −Z. The center of each of the plurality of fixing members 86 is located on a second virtual circle VC2 around the optical axis AL and having a diameter greater than the diameter of the first virtual circle VC1 when viewed in the direction −Z.

Further, the plurality of fixing members 64 are disposed between the plurality of fixing members 66 in the circumferential direction around the optical axis AL.

The plurality of fixing members 64 can thus be disposed between the outer edge of the first light collection lens 44 and the plurality of fixing members 66 and between the plurality of fixing members 86. The plurality of fixing members 64 and the plurality of fixing members 86 can therefore be densely disposed with the fixing members 64 not being in contact with the first light collection lens 44.

Figure 11:
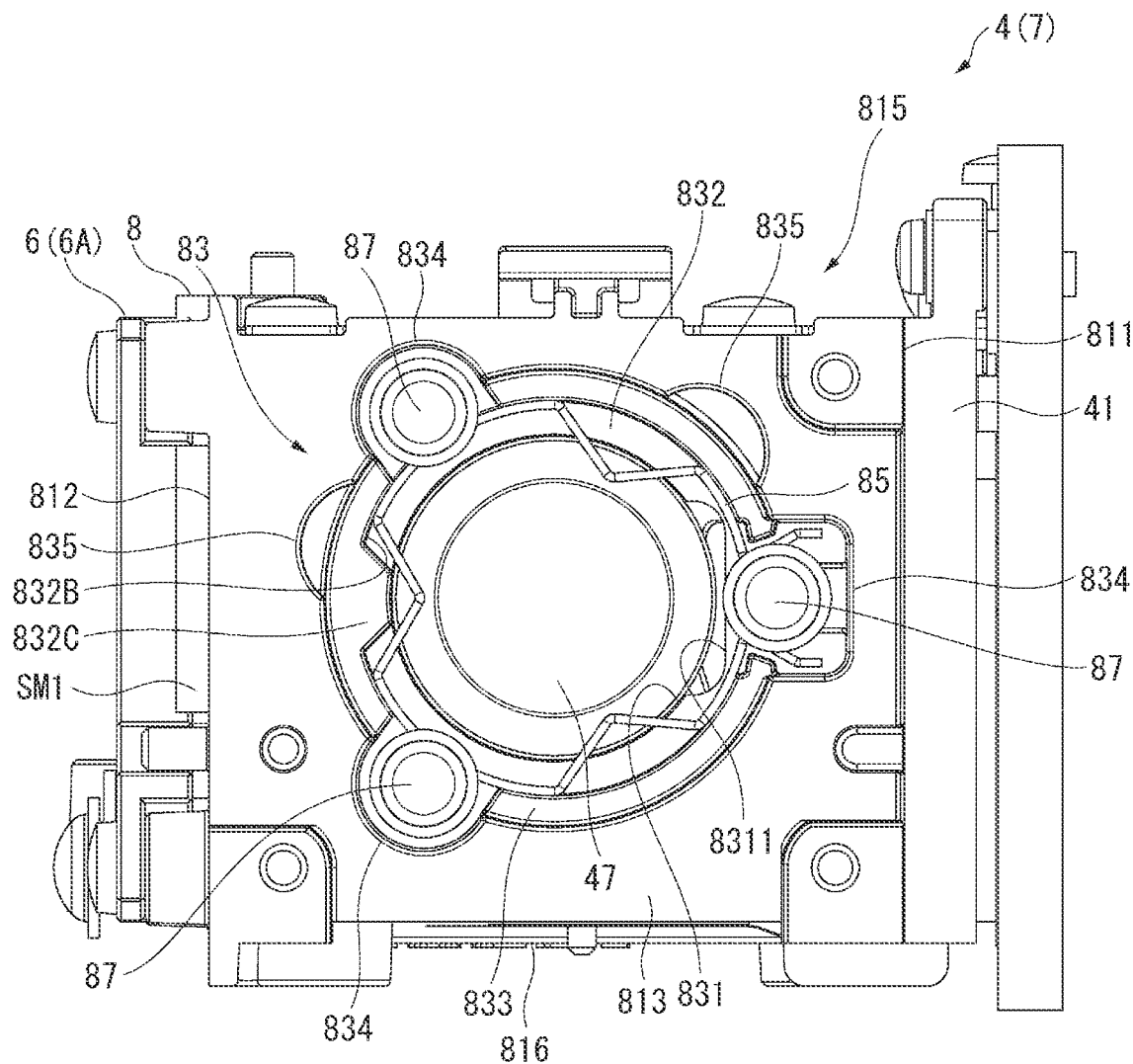
FIG. 11 shows a lens attachment section and a third light collection lens in the embodiment.

FIG. 11 shows the third light collection lens 47 fixed to the lens attachment section 83 viewed in the direction −Z.

The lens attachment section 83 is a portion which is located in the enclosure main body 3 in a position inside the third side surface section 813 and to which the third light collection lens 47 is attached. The lens attachment section 83 has the same configuration as that of the lens attachment section 82. That is, the lens attachment section 83 includes a first recess 331, a second recess 832, a third recess 833, a plurality of fixing sections 334, and a plurality of stepped sections 335, as shown in FIG. 11, which are similar to the first recess 821, the second recess 822, the third recess 823, the plurality of fixing sections 824, and the plurality of stepped sections 825. The first recess 831 has an opening 8311, in which part of the third light collection lens 47 is disposed.

The plurality of fixing sections 86, which are fixed to the corresponding fixing sections 834, fix the pressing member 85, which is fixed to the lens attachment section 83, to the lens attachment section 83, and the pressing member 85 presses the third light collection lens 47 against the first bottom surface of the first recess 831 and fixes the third light collection lens 47 thereto.

The configuration described above allows the third light collection lens 47 to be fixed to the lens attachment section 83.

The lens attachment section 83 differs from the lens attachment section 82 in that the lens attachment section 83 includes the two stepped sections 835 and is also provided with a protrusion 832C, which protrudes from a second side surface 832B of the second recess 832 toward the third light collection lens 47, but not necessarily. The lens attachment sections 82 and 83 may instead have the same configuration.

Effects of Embodiment

The diffusion apparatus 6 according to the present embodiment described above can provided the following effects.

The diffusion apparatus 6 includes the diffuser 65, which diffuses light, the substrate 61, to which the diffuser 65 is fixed, and the lens 62, which serves as the first lens and is so fixed to the substrate 61 as to face the diffuser 65.

The lens 62 has the curved surface 62A and the flat surface 62B, which is located on the side opposite the curved surface 62A.

The substrate 61 has the first recess 611 and the second recess 612. The first recess 611 has the first bottom surface 611A and the first side surface 611B, which rises in the direction −N from the first bottom surface 611A. The second recess 612 has the second bottom surface 612A, which is connected to the first side surface 611B, and the second side surface 612B, which rises in the direction −N from the second bottom surface 612A.

The lens 62 is so disposed in the second recess 612 that the flat surface 623 is in contact with the second bottom surface 612A. The diffuser 65 is fixed to the first bottom surface 611A.

According to the configuration described above, the lens 62 and the diffuser 65 are disposed on the same substrate 61. The distance between the lens 62 and the diffuser 65 is determined by the dimension of the first side surface 611B in the direction from the lens 62 toward the diffuser. Forming the substrate 61 with precision therefore allows the lens 62 to be so disposed with respect to the diffuser 65 that the distance between the lens 62 and the diffuser 65 has an appropriate value. Therefore, unlike a case where a member that holds the diffuser 65 and a member that holds the lens 62 are different members, a dimension error of each of the members does not accumulate, whereby the lens 62 can be precisely disposed with respect to the diffuser 65.

Further, since the flat surface 62B of the lens 62 is in contact with the second bottom surface 612A, a space in the first recess 611 that is the space formed by the first recess 611, the diffuser 65, and the lens 62 can be sealed. Adhesion of dust to a surface of the diffuser 65 that is the surface facing the lens 62 can therefore be suppressed. Therefore, dustproof performance of the diffusion apparatus 6 can be enhanced, and a decrease in the optical performance of the diffusion apparatus 6 due to the dust adhesion can be suppressed.

The diffusion apparatus 6 includes the pressing member 63, which serves as the first pressing member and presses the lens 62 against the second bottom surface 612A. The substrate 61 includes the third recess 613. The third recess 613 has the third bottom surface 613A, which is connected to the second side surface 612B, and the third side surface 613B, which rises in the direction −N from the third bottom surface 613A. The pressing member 63 is fixed to the third bottom surface 613A.

According to the configuration described above, the pressing member 63, which is fixed to the third bottom surface 613A, presses the lens 62 against the second bottom surface 612A and fixes the lens 62 thereto, whereby it is not necessary to fix the pressing member 63 with an adhesive. A situation in which a gas is produced in the first recess 611 due, for example, to evaporation of such an adhesive can therefore be suppressed. A decrease in optical diffusion performance of the diffuser 65 due to such a gas can therefore be avoided.

The pressing member 63 is fixed to the third bottom surface 613A. That is, the pressing member 63 is disposed in the third recess 613, whereby an increase in the dimension of the diffusion apparatus 6 in the direction +N, which is the direction from the lens 62 toward the diffuser 65, can be suppressed. An increase in the size of the diffusion apparatus 6 can therefore be suppressed.

In the diffusion apparatus 6, the pressing member 63 is formed of a wire. The pressing member 63 is in contact with the curved surface 62A at a plurality of locations to urge the lens 62 against the second bottom surface 612A.

According to the configuration described above, the pressing member 63 can be readily configured. Further, since the pressing member 63 is in contact with the curved surface 62A to press the lens 62 against the second bottom surface 612A, the sealed state of the first recess 611 can be maintained.

The optical apparatus DV according to the present embodiment described above can provide the following effects.

The optical apparatus DV includes the first diffusion apparatus 6A and the second diffusion apparatus 6B, which are provided in the diffusion apparatus 6, the enclosure 7, to which the substrate 61 is fixed, the first light collection lens 44 and the third light collection lens 47, which serve as the second lens, and the pressing members 84 and 85, which serve as the second pressing member.

The first light collection lens 44 is so provided in the first diffusion apparatus 6A as to face the second light collection lens 45 employed as the first lens. The third light collection lens 47 is so provided in the second diffusion apparatus 6B as to face the fourth light collection lens 48 employed as the first lens.

The enclosure main body 8, which forms the enclosure 7, includes the lens attachment section 82, to which the first light collection lens 44 is attached, and the lens attachment section 83, to which the third light collection lens 47 is attached.

The pressing member 84 is fixed to the enclosure main body 8 to press the first light collection lens 44 against the lens attachment section 82, and the pressing member 85 is fixed to the enclosure main body 8 to press the third light collection lens 47 against the lens attachment section 83.

According to the configuration described above, the first light collection lens 44, which is so provided as to face the second light collection lens 45, allows the light incident on the first light collection lens 44 from the negative side of the direction Z, which is the side opposite the second light collection lens 45, to efficiently enter the wavelength converter 46, which is a diffuser, via the first light collection lens 44 and the second light collection lens 45. Similarly, the third light collection lens 47, which is so provided as to face the fourth light collection lens 48, allows the light incident on the third light collection lens 47 from the positive side of the direction X, which is the side opposite the fourth light collection lens 48, to efficiently enter the diffusive reflector 49, which is a diffuser, via the third light collection lens 47 and the fourth light collection lens 48.

The first light collection lens 44 and the third light collection lens 47 are pressed by the pressing members 84 and 35 against the lens attachment sections 82 and 83 and fixed thereto. It is therefore unnecessary to fix the first light collection lens 44 and the third light collection lens 47 with an adhesive. The configuration described above can therefore suppress production of a gas and adhesion of such a gas to the light collection lenses 44, 45, 47, and 48, whereby a decrease in light use efficiency can be suppressed.

The optical apparatus DV further includes the first diffusion apparatus 6A and the second diffusion apparatus 6B, which are provided in the diffusion apparatus 6, and the light guide apparatus GD, which guides light to the diffusion apparatuses 6A and 6B.

The diffusion apparatus 6 includes the substrate 61, the lens 62 as the first lens, the pressing member 63 as the first pressing member, the plurality of fixing members 64 as the plurality of first fixing members, and the diffuser 65. The diffuser 65 is fixed to the substrate 61. The lens 62 is so fixed to the substrate 61 as to face the diffuser 65. The pressing member 63 presses the lens 62 against the substrate 61. The plurality of fixing members 64 are fixed to the substrate 61 and hold the pressing member 63.

In the first diffusion apparatus 6A, the lens 62 is the second light collection lens 45, and the diffuser 65 is the wavelength converter 46. In the second diffusion apparatus 6B, the lens 62 is the fourth light collection lens 48, and the diffuser 65 is the diffusive reflector 49.

The second light collection lens 45 has the curved surface 45A and the flat surface 45B, which is located on the side opposite the curved surface 45A. The fourth light collection lens 48 has the curved surface 48A and the flat surface 48B, which is located on the side opposite the curved surface 48A.

The substrate 61 has the first recess 611 and the second recess 612, which surrounds the first recess 611.

The first recess 611 has the first bottom surface 611A and the first side surface 611B, which rises in the direction −N from the first bottom surface 611A. The second recess 612 has the second bottom surface 612A, which is connected to the first side surface 611B, and the second side surface 612B, which rises in the direction −N from the second bottom surface 612A.

In the first diffusion apparatus 6A, the second light collection lens 45 is so pressed by the pressing member 63 and disposed in the second recess 612 that the flat surface 45B is in contact with the second bottom surface 612A. In the second diffusion apparatus 6B, the fourth light collection lens 48 is so pressed by the pressing member 63 and disposed in the second recess 612 that the flat surface 48B is in contact with the second bottom surface 612A.

The light guide apparatus GD includes the enclosure 7, the first light collection lens 44 and the third light collection lens 47 as the second lens, the pressing members 84 and 85 as the second pressing member, and the plurality of fixing members 86 and 87 as the plurality of second fixing members.

The substrate 61 is fixed to the enclosure 7. The first light collection lens 44 is so provided in the enclosure 7 as to face the second light collection lens 45 corresponding to the first lens. The third light collection lens 47 is so provided in the enclosure 7 as to face the fourth light collection lens 48 corresponding to the first lens. The pressing member 84 presses the first light collection lens 44 against the enclosure 7. The pressing member 85 presses the third light collection lens 47 against the enclosure 7. The plurality of fixing members 86 are fixed to the enclosure 7 to hold the pressing member 84, and the plurality of fixing members 87 are fixed to the enclosure 7 to hold the pressing member 85.

The plurality of fixing members 64 are disposed on the first virtual circle VC1 around the optical axis AL of the first light collection lens 44 when viewed in the direction −Z, which is the direction from the first light collection lens 44 toward the diffuser 65. The plurality of fixing members 86 are disposed on the second virtual circle VC2 around the optical axis AL and having a diameter greater than the diameter of the first virtual circle VC1 when viewed in the direction −Z. The plurality of fixing members 64 are disposed between the plurality of fixing members 86 in the circumferential direction around the optical axis AL. The same holds true for the positional relationship between the plurality of fixing members 64, which fix the pressing member 63 of the second diffusion apparatus 6B, and the plurality of fixing members 87.

The configuration described above can provide the same effects as those provided by the diffusion apparatus 6 described above and the optical apparatus DV described above.

Further, the plurality of fixing members 64 and 86 can be densely disposed with the plurality of fixing members 64 of the first diffusion apparatus 6A not being in contact with the first light collection lens 44 or the plurality of fixing members 86. Similarly, the plurality of fixing members 64 and 87 can be densely disposed with the plurality of fixing members 64 of the second diffusion apparatus 6B not being in contact with the third light collection lens 47 or the plurality of fixing members 67. An increase in the size of the enclosure 7 and in turn the optical apparatus DV can therefore be suppressed.

The enclosure main body 8 of the enclosure 7 includes the plurality of stepped sections 825 that are provided around the first light collection lens 44 in accordance with the plurality of fixing members 64 and recessed in the direction +Z, which is the direction from the second light collection lens 45 toward the first light collection lens 44. Similarly, the enclosure main body 8 includes the plurality of stepped sections 825 that are provided around the third light collection lens 47 in accordance with the plurality of fixing members 64 and recessed in the direction +X, which is the direction from the fourth light collection lens 48 toward the third light collection lens 47.

According to the configuration described above, contact of the fixing members 64 with the first light collection lens 44 can be suppressed, whereby the distance between the first light collection lens 44 and the second light collection lens 45 can be shortened. Similarly, contact of the fixing members 64 with the third light collection lens 47 can be suppressed, whereby the distance between the third light collection lens 47 and the fourth light collection lens 48 can be shortened. The size of the optical apparatus DV can therefore be reduced as compared with a case where an enclosure 7 including no stepped sections 825 is provided.

The light source apparatus 4 according to the present embodiment provides the following effects.

The light source apparatus 4 includes the light source 411, which outputs light, and the optical apparatus DV.

The optical apparatus DV includes the light separator 43, which separates the light outputted from the light source 411 into the first partial light and the second partial light. The diffusion apparatus 6 provided in the light source apparatus 4 includes the first diffusion apparatus 6A, which is fixed to the enclosure 7 and in which the first partial light enters the diffuser 65, and the second diffusion apparatus 6E, which is fixed to the enclosure 7 and in which the second partial light enters the diffuser 65.

The diffuser 65 of the first diffusion apparatus 6A is the wavelength converter 46, which converts the wavelength of the light incident thereon, diffuses the converted light in the direction opposite the direction in which the incident light travels, and outputs the diffused light. The diffuser 65 of the second diffusion apparatus 6B is the diffusive reflector 49, which does not convert the wavelength of the light incident thereon but diffusively reflects the incident light. The light separator 43 combines the light outputted from the first diffusion apparatus 6A and the light outputted from the second diffusion apparatus 6B with each other and outputs the combined light.

The optical apparatus DV further includes the first light collection lens 44, which is the second lens for a first diffusion apparatus so provided in the enclosure main body 8 as to face the second light collection lens 45 as the first lens, and the third light collection lens 47, which is the second lens for a second diffusion apparatus so provided in the enclosure main body 8 as to face the fourth light collection lens 48 as the first lens.

The configuration described above can provide the same effects as those provided by the optical apparatus DV described above.

Since the first diffusion apparatus 6A and the second diffusion apparatus 6B have substantially the same configuration except for the configuration of the diffuser 65, the configuration of the light source apparatus 4 can be simplified.

Further, the first light collection lens 44 and the third light collection lens 47 are attached to the enclosure 7, to which the first diffusion apparatus 6A and the second diffusion apparatus 6B are fixed. An increase in the size of the light source apparatus 4 can therefore be suppressed as compared with a case where that employs an enclosure including a lens holder that holds the first light collection lens 44 and the second light collection lens 45 provided in accordance with the wavelength converter 46 and a lens holder that holds the third light collection lens 47 and the fourth light collection lens 48 provided in accordance with the diffusive reflector 49.

The projector 1 according to the present embodiment provides the following effects.

The projector 1 includes the light source 411, which outputs light, the optical apparatus DV, which the light outputted from the light source 411 enters, the light modulators 343, which modulate the light outputted from the optical apparatus DV, and the projection optical apparatus 36, which projects the light modulated by the light modulators 343.

The configuration described above can suppress an increase in the size of the projector 1.

The projector 1 according to the present embodiment provides the following effects.

The projector 1 includes the light source 411, which outputs light, the diffusion apparatus 6, which the light outputted from the light source 411 enters, the light modulators 343, which modulate the light outputted from the diffusion apparatus 6, and the projection optical apparatus 36, which projects the light modulated by the light modulators 343.

The configuration described above can suppress an increase in the size of the projector 1.

Variations of Embodiment

The present disclosure is not limited to the embodiment described above, and variations, improvements, and other modifications to the extent that the advantage of the present disclosure is achieved fall within the scope of the present disclosure.

In the embodiment described above, the wavelength converter 46, which includes the wavelength conversion layer 461 and the reflection layer 462 and converts the wavelength of the light incident thereon, diffuses the converted light in the direction opposite the direction in which the incident light travels, and outputs the diffused light, and the diffusive reflector 49, which does not convert the wavelength of the light incident thereon but diffusively reflects the incident light, are presented, by way of example, as the diffuser 65, but not necessarily. The diffuser employed in the diffusion apparatus may have a configuration in which the wavelength of the incident light is converted and the converted light is diffused and outputted along the light incident direction or a configuration in which the wavelength of the incident light is not converted but is diffused and outputted along the light incident direction. That is, the diffuser may not necessarily have the configuration in which the direction in which light enters the diffuser is opposite the direction in which the light exits out of the diffuser and may instead have a configuration in which the direction in which light enters the diffuser is the same as the direction in which the light exits out of the diffuser.

In this case, providing the first bottom surface 611A with a passage port through which light passes allows the light having passed through the diffuser to exit toward the side opposite the lens with respect to the diffuser. Further, in this case, the diffuser may be provided in the passage port.

In the embodiment described above, the lens 62 as the first lens has the curved surface 62A, which is the surface facing the negative side of the direction N, which is the light incident side on which light outside the diffusion apparatus 6 is incident, and the flat surface 623, which is the surface on the light exiting side and facing the positive side of the direction N, which is the side facing the diffuser 65, but not necessarily. A surface of the first lens that is the surface facing the diffuser may be a curved surface. In this case, the first lens may have a flange protruding outward in the radial direction around the optical axis of the first lens, and a surface of the flange that is the surface facing the diffuser may be a flat surface.

In the embodiment described above, the lens 62 is pressed by the pressing member 63 as the first pressing member against the substrate 61 and fixed thereto, but not necessarily. The lens 62 may be fixed to the substrate 61 by using any other method. For example, the lens 62 may be fixed to the substrate 61 with an adhesive.

The pressing member 63 is formed of a wire and is a frame-shaped member having the shape shown in FIGS. 3 and 4, but not necessarily. The pressing member only needs to press the lens 62 against the second bottom surface 612A and fix the lens 62 thereto, and the configuration of the pressing member is not limited to that described above. For example, the pressing member may be a plate-shaped spring.

In addition to the above, the pressing member 63 includes the three contact sections 631, which are in contact with the curved surface 62A of the lens 62, but not necessarily. The pressing member 63 only needs to include two or more contact sections 631.

In the embodiment described above, the substrate 61 includes the first recess 611, in which the diffuser 65 is disposed, the second recess 612, in which the lens 62 is disposed, and the third recess 613, to which the pressing member 63 is fixed, but not necessarily. The third recess 613 may be omitted. Similarly, the lens attachment section 82 or 83 may not include the third recess 823 or 833.

Further, the pressing member 63 may not be fixed to the third recess 613.

In the embodiment described above, the optical apparatus DV and the light source apparatus 4 include the first diffusion apparatus 6A and the second diffusion apparatus 6B attached to the enclosure main body 8, but not necessarily. The optical apparatus and the light source apparatus according to the present disclosure may have a configuration including one diffusion apparatus or a configuration including three or more diffusion apparatuses.

In the embodiment described above, the first light collection lens 44 and the third light collection lens 47 as the second lens are pressed by the pressing members 84 and 85 as the second pressing member against the first recesses 821 and 831 of the lens attachment sections 82 and 83 and fixed thereto, but not necessarily. At least one of the first light collection lens 44 and the third light collection lens 47 may not be fixed by the pressing member 84 or 85.

In the embodiment described above, the fixing members 64 as the first fixing members provided in the first diffusion apparatus 6A are so provided, when the first diffusion apparatus 6A is attached to the second side surface section 812 of the enclosure main body 8, as to be located on the first virtual circle VC1 around the optical axis AL of the first light collection lens 44 as the second lens when viewed in the direction −Z. The fixing members 86, which serve as the second fixing members and fix the pressing member 84, which presses the first light collection lens 44, to the lens attachment section 82, are so provided as to be located on the second virtual circle VC2 around the optical axis AL and having a diameter greater than the diameter of the first virtual circle VC1 when viewed in the direction −Z. Further, the fixing members 64 are each provided between the plurality of fixing members 86 in the circumferential direction around the optical axis AL. The layouts described above are not necessarily employed, and the layouts of the fixing members 64 and 86 can be changed as appropriate.

The same holds true for the fixing members 64, which serve as the first fixing members provided in the second diffusion apparatus 6B, and the fixing members 87, which fix the pressing member 85, which presses the third light collection lens 47, to the lens attachment section 83.

In the embodiment described above, the lens attachment section 82 includes the stepped sections 82S, which prevent interference with the fixing members 64 when the first diffusion apparatus 6A is attached to the second side surface section 812. Similarly, the lens attachment section 83 includes the stepped sections 83S, which prevent interference with the fixing members 64 when the second diffusion apparatus 6B is attached to the third side surface section 813. The configurations described above are not necessarily employed, and at least one of the lens attachment sections 82 and 83 may include no stepped section.

In the embodiment described above, the light source apparatus 4 includes the diffusive transmitter 42 and the retarder 50, but not necessarily. The light source apparatus 4 may have, in place of or in addition to the diffusion transmitter 42 and the retarder 50, another configuration. That is, the configuration of the light source apparatus 4 and the layout of optical parts that form the light source apparatus 4 are not limited to the configuration and layout shown in FIG. 2 by way of example. For example, the light source apparatus according to the present disclosure may include, between the first light collection lens 44 and the second light collection lens 45, another light collection lens or may include, between the third light collection lens 47 and the fourth light collection lens 46, another light collection lens. In this case, the other light collection lens may be fixed to the substrate 61 or the enclosure 7.

In the embodiment described above, the projector 1 includes the three light modulators 343 (343B, 343G, and 343R), but not necessarily. The present disclosure is also applicable to a projector including two or less or four or more light modulators.

In the embodiment described above, the light modulators 343 are each a transmissive liquid crystal panel having a light incident surface and a light exiting surface different from each other, but not necessarily. The light modulators may each be a reflective liquid crystal panel having a surface that serves both as the light incident surface and the light exiting surface. Further, a light modulator using any component other than a liquid-crystal-based component and capable of modulating an incident light flux to form an image according to image information, such as a device using micromirrors, for example, a digital micromirror device (DMD), may be employed.

In the embodiment described above, the image projection section 3 having the layout shown in FIG. 1 and the configuration including the optical parts shown in FIG. 1 by way of example, but not necessarily. The present disclosure may be applied to a projector including an image projection section having another layout and including other optical parts.

In the embodiment described above, the diffusion apparatus 6 including the first diffusion apparatus 6A and the second diffusion apparatus 6B is used in the optical apparatus DV and the light source apparatus 4, and the optical apparatus DV and the light source apparatus 4 are used in the projector 1, but not necessarily. The diffusion apparatus according to the present disclosure may be used alone or in a configuration other than an optical apparatus or a light source apparatus. Similarly, the optical apparatus and the light source apparatus according to the present disclosure may be used in an electronic apparatus other than a projector, such as an illuminator.

Overview of Present Disclosure

The present disclosure will be summarized below as additional remarks.

A diffusion apparatus according to a first aspect of the present disclosure includes a diffuser that diffuses light, a substrate to which the diffuser is fixed, and a first lens that has a curved surface and a flat surface located on the side opposite the curved surface and is so fixed to the substrate as to face the diffuser. The substrate includes a first recess having a first bottom surface and a first side surface that rises from the first bottom surface and a second recess having a second bottom surface connected to the first side surface and a second side surface that rises from the second bottom surface. The first lens is so disposed in the second recess that the flat surface is in contact with the second bottom surface, and the diffuser is fixed to the first bottom surface.

According to the configuration described above, the first lens and the diffuser are disposed on the same substrate. The distance between the first lens and the diffuser is determined by the dimension of the first side surface in the direction from the first lens toward the diffuser. Forming the substrate with precision therefore allows the first lens to be so disposed with respect to the diffuser that the distance between the first lens and the diffuser has an appropriate value. Therefore, unlike a case where a member that holds the diffuser and a member that holds the first lens are different members, a dimension error of each of the members does not accumulate, whereby the first lens can be precisely disposed with respect to the diffuser.

Further, since the flat surface of the first lens is in contact with the second bottom surface, a space in the first recess that is the space formed by the first recess, the diffuser, and the first lens can be sealed. At least adhesion of dust to a surface of the diffuser that is the surface facing the first lens can therefore be suppressed. Therefore, the dustproof performance of the diffuser can be enhanced, and a decrease in the optical performance of the diffusion apparatus due to the dust adhesion can be suppressed.

In the first aspect described above, the diffusion apparatus may further include a first pressing member that presses the first lens against the second bottom surface, the substrate may include a third recess having a third bottom surface connected to the second side surface and a third side surface that rises from the third bottom surface, and the first pressing member may be fixed to the third bottom surface.

According to the configuration described above, the first pressing member, which is fixed to the third bottom surface, presses the first lens against the second bottom surface and fixes the first lens thereto, whereby it is not necessary to fix the first pressing member with an adhesive. A situation in which a gas is produced in the first recess due, for example, to evaporation of such an adhesive can therefore be suppressed. A decrease in optical diffusion performance of the diffuser due to such a gas can therefore be avoided.

The first pressing member is fixed to the third bottom surface. That is, since the first pressing member is disposed in the third recess, an increase in the dimension of the diffusion apparatus in the direction from the first lens toward the diffuser can be suppressed. An increase in the size of the diffusion apparatus can therefore be suppressed.

In the first aspect described above, the first pressing member may be formed of a wire and may be in contact with the curved surface at a plurality of locations to press the first lens against the second bottom surface.

According to the configuration described above, the first pressing member can be readily configured. Further, since the first pressing member is in contact with the curved surface to press the first lens against the second bottom surface, the sealed state of the first recess can be maintained.

An optical apparatus according to a second aspect of the present disclosure includes the diffusion apparatus described above, an enclosure to which the substrate is fixed, a second lens so provided as to face the first lens, and a second pressing member that presses the second lens against the enclosure. The enclosure includes a lens attachment section to which the second lens is attached, and the second pressing member is fixed to the enclosure to press the second lens against the lens attachment section.

According to the configuration described above, in which the second lens is so provided as to face the first lens, light incident on the second lens from the side opposite the first lens is allowed to efficiently enter the diffuser via the first lens and the second lens.

The second lens is pressed by the second pressing member against the lens attachment section and fixed thereto. It is therefore unnecessary to fix the second lens with an adhesive. The configuration described above can therefore suppress production of a gas and adhesion of such a gas to the first and second lenses, whereby a decrease in light use efficiency can be suppressed.

A projector according to a third aspect of the present disclosure includes a light source that outputs light, the optical apparatus described above that the light outputted from the light source enters, a light modulator that modulates light outputted from the optical apparatus, and a projection optical apparatus that projects light modulated by the light modulator.

The configuration described above can suppress an increase in the size of the projector.

A projector according to a fourth aspect of the present disclosure includes a light source that outputs light, the diffusion apparatus described above that the light outputted from the light source enters, a light modulator that modulates light outputted from the diffusion apparatus, and a projection optical apparatus that projects light modulated by the light modulator.

The configuration described above can suppress an increase in the size of the projector.

What is claimed is:

1. A diffusion apparatus comprising:
a diffuser that diffuses light;
a substrate to which the diffuser is fixed;
a first lens that has a curved surface and a flat surface located on a side opposite the curved surface and is so fixed to the substrate as to face the diffuser; and
a first pressing member that presses the first lens against a second bottom surface,
wherein the substrate includes
a first recess having a first bottom surface and a first side surface that rises from the first bottom surface,
a second recess having the second bottom surface connected to the first side surface and a second side surface that rises from the second bottom surface, and
a third recess having a third bottom surface connected to the second side surface and a third side surface that rises from the third bottom surface,
the first pressing member is fixed to the third bottom surface,
the first lens is so disposed in the second recess that the flat surface is in contact with the second bottom surface, and
the diffuser contacts with the first bottom surface.

2. The diffusion apparatus according to claim 1,
wherein the first pressing member is formed of a wire and is in contact with the curved surface at a plurality of locations to press the first lens against the second bottom surface.

3. An optical apparatus comprising:
the diffusion apparatus according to claim 1;
an enclosure to which the substrate is fixed;
a second lens so provided as to face the first lens; and
a second pressing member that presses the second lens against the enclosure,
wherein the enclosure includes a lens attachment section to which the second lens is attached, and
the second pressing member is fixed to the enclosure to press the second lens against the lens attachment section.

4. An optical apparatus comprising:
the diffusion apparatus according to claim 2;
an enclosure to which the substrate is fixed;
a second lens so provided as to face the first lens; and
a second pressing member that presses the second lens against the enclosure,
wherein the enclosure includes a lens attachment section to which the second lens is attached, and
the second pressing member is fixed to the enclosure to press the second lens against the lens attachment section.

5. A projector comprising:
a light source that outputs light;
the optical apparatus according to claim 3 the light outputted from the light source enters;
a light modulator that modulates light outputted from the optical apparatus; and
a projection optical apparatus that projects light modulated by the light modulator.

6. A projector comprising:
a light source that outputs light;
the optical apparatus according to claim 4 the light outputted from the light source enters;
a light modulator that modulates light outputted from the optical apparatus; and
a projection optical apparatus that projects light modulated by the light modulator.

7. A projector comprising:
a light source that outputs light;
the diffusion apparatus according to claim 1 that the light outputted from the light source enters;
a light modulator that modulates light outputted from the diffusion apparatus; and
a projection optical apparatus that projects light modulated by the light modulator.

8. A projector comprising:
a light source that outputs light;
the diffusion apparatus according to claim 2 the light outputted from the light source enters;
a light modulator that modulates light outputted from the diffusion apparatus; and
a projection optical apparatus that projects light modulated by the light modulator.

9. The diffusion apparatus according to claim 1,
wherein the diffuser is a wavelength converter.

10. The diffusion apparatus according to claim 1,
wherein the diffuser is a diffusive reflector.

11. An optical apparatus comprising:
a diffusion apparatus including:
- a diffuser that diffuses light,
- a substrate to which the diffuser is fixed, and
- a first lens that has a curved surface and a flat surface located on a side opposite the curved surface and is so fixed to the substrate as to face the diffuser;

an enclosure to which the substrate is fixed;
a second lens so provided as to face the first lens; and
a second pressing member that presses the second lens against the enclosure,
- wherein the substrate includes
- a first recess having a first bottom surface and a first side surface that rises from the first bottom surface,
- a second recess having the second bottom surface connected to the first side surface and a second side surface that rises from the second bottom surface, and
- the first lens is so disposed in the second recess that the flat surface is in contact with the second bottom surface,
- the diffuser contacts with the first bottom surface,
- the enclosure includes a lens attachment section to which the second lens is attached, and
- the second pressing member is fixed to the enclosure to press the second lens against the lens attachment section.

* * * * *